(12) United States Patent
Yu

(10) Patent No.: US 10,430,031 B2
(45) Date of Patent: Oct. 1, 2019

(54) DISPLAYING HDMI CONTENT IN A TILED WINDOW

(71) Applicant: EVA Automation, Inc., Redwood City, CA (US)

(72) Inventor: Gaylord Yu, San Francisco, CA (US)

(73) Assignee: EVA Automation, Inc., Menlo Park, CA (US)

( * ) Notice: Subject to any disclaimer, the term of this patent is extended or adjusted under 35 U.S.C. 154(b) by 140 days.

(21) Appl. No.: 15/593,306

(22) Filed: May 11, 2017

(65) Prior Publication Data

US 2017/0249063 A1 Aug. 31, 2017

Related U.S. Application Data

(63) Continuation-in-part of application No. 15/250,933, filed on Aug. 30, 2016.

(Continued)

(51) Int. Cl.
| | |
|---|---|
| *G06F 3/0482* | (2013.01) |
| *G06T 3/40* | (2006.01) |
| *G06F 3/0481* | (2013.01) |
| *G06F 3/0484* | (2013.01) |
| *H04N 21/41* | (2011.01) |

(Continued)

(52) U.S. Cl.
CPC .......... *G06F 3/0482* (2013.01); *G06F 3/0484* (2013.01); *G06F 3/04817* (2013.01); *G06T 3/40* (2013.01); *H04N 21/4122* (2013.01); *H04N 21/4126* (2013.01); *H04N 21/42206* (2013.01); *H04N 21/42224* (2013.01); *H04N 21/4316* (2013.01); *H04N 21/43615* (2013.01); *H04N 21/43635* (2013.01); *H04N 21/43637* (2013.01); *H04N 21/4622* (2013.01); *H04N 21/6125* (2013.01); *G06F 3/0488* (2013.01)

(58) Field of Classification Search
CPC .. G06F 3/0482; G06F 3/0481; G06F 3/04817; G06T 3/40
See application file for complete search history.

(56) References Cited

U.S. PATENT DOCUMENTS

5,014,125 A * 5/1991 Pocock .............. H04N 1/00098
348/484
5,883,670 A * 3/1999 Sporer .................. G06F 3/0483
348/441

(Continued)

OTHER PUBLICATIONS

Office Action, U.S. Appl. No. 15/250,933, dated Sep. 24, 2018.
Response to Office Action, U.S. Appl. No. 15/250,933, dated Dec. 23, 2018.

*Primary Examiner* — Reza Nabi
(74) *Attorney, Agent, or Firm* — Steven Stupp

(57) ABSTRACT

In response to receiving user-interface activity information from a portable electronic device that specifies user selection of a content source, an audio/video (A/V) hub provides a request for high-definition multimedia-interface (HDMI) content to the content source based on the user selection. When the A/V hub receives the HDMI content from the content source, the A/V hub provide the HDMI content and display instructions to an A/V display device as frames with the HDMI content are received from the content source, so that the HDMI content is displayed in a tiled window on the display in the A/V display device while other HDMI content from another content source is displayed on the display.

17 Claims, 24 Drawing Sheets

Related U.S. Application Data

(60) Provisional application No. 62/211,825, filed on Aug. 30, 2015.

(51) Int. Cl.
*H04N 21/422* (2011.01)
*H04N 21/431* (2011.01)
*H04N 21/436* (2011.01)
*H04N 21/4363* (2011.01)
*H04N 21/462* (2011.01)
*H04N 21/61* (2011.01)
*G06F 3/0488* (2013.01)

(56) References Cited

U.S. PATENT DOCUMENTS

| | | | | |
|---|---|---|---|---|
| 5,903,261 | A * | 5/1999 | Walsh | G09G 5/397 345/418 |
| 8,380,887 | B2 * | 2/2013 | Lee | G09G 5/006 348/723 |
| 8,786,631 | B1 * | 7/2014 | Collins | H04N 9/75 345/545 |
| 2005/0060421 | A1 * | 3/2005 | Musunuri | H04L 29/06027 709/231 |
| 2009/0244378 | A1 * | 10/2009 | Chen | H04N 5/45 348/565 |
| 2009/0310672 | A1 * | 12/2009 | Rao | H04N 7/148 375/240.03 |
| 2010/0269128 | A1 * | 10/2010 | Gordon | H04N 7/17318 725/25 |
| 2011/0181781 | A1 * | 7/2011 | Oh | H04N 21/42646 348/565 |
| 2012/0092441 | A1 * | 4/2012 | Kong | H04L 63/083 348/14.08 |
| 2012/0092444 | A1 * | 4/2012 | Mackie | H04L 12/1822 348/14.12 |
| 2012/0117584 | A1 * | 5/2012 | Gordon | H04N 21/254 725/19 |
| 2012/0120085 | A1 * | 5/2012 | Kanalakis, Jr. | H04N 5/44504 345/589 |
| 2012/0120181 | A1 * | 5/2012 | Kanalakis, Jr. | H04N 5/23203 348/14.03 |
| 2012/0120184 | A1 * | 5/2012 | Fornell | H04N 7/147 348/14.12 |
| 2012/0120270 | A1 * | 5/2012 | Li | H04N 5/60 348/222.1 |
| 2012/0127259 | A1 * | 5/2012 | Mackie | H04N 7/142 348/14.07 |
| 2013/0058593 | A1 * | 3/2013 | Kanalakis, Jr. | H04N 7/007 382/286 |
| 2014/0204107 | A1 * | 7/2014 | Laksono | H04N 19/46 345/547 |
| 2014/0362294 | A1 * | 12/2014 | Majid | H04N 5/445 348/564 |
| 2014/0362922 | A1 * | 12/2014 | Puri | H04N 19/61 375/240.16 |
| 2015/0003520 | A1 * | 1/2015 | Mody | H04N 19/119 375/240.08 |
| 2015/0364158 | A1 * | 12/2015 | Gupte | G11B 27/3081 386/223 |
| 2016/0337689 | A1 * | 11/2016 | Yoshimura | H04N 21/42607 |
| 2017/0064313 | A1 * | 3/2017 | Wu | H04N 19/33 |

* cited by examiner

DISPLAYING HDMI CONTENT IN A TILED WINDOW

CROSS REFERENCE TO RELATED APPLICATIONS

This application claims priority under 35 U.S.C. 120 as a Continuation-in-Part of U.S. patent application Ser. No. 15/250,933, entitled "Displaying HDMI Content in a Tiled Window," by Gaylord Yu, filed Aug. 30, 2016, which claims priority under 35 U.S.C. 119(e) to U.S. Provisional Application Ser. No. 62/211,825, "Displaying HDMI Content in a Tiled Window," filed on Aug. 30, 2015, the contents of both of which are herein incorporated by reference.

BACKGROUND

Field

The described embodiments relate to display techniques, including displaying high-definition multimedia-interface (HDMI) content on a display in a tiled window.

Related Art

The versatility and capabilities of consumer-electronics or entertainment devices is increasing their popularity. For example, the communication capabilities of these entertainment devices allow users to access content from a wide variety of sources, including high-definition content.

However, while the entertainment devices typically include high-resolution displays that allow users to view high-definition content, the interface circuits and the communication bandwidth in many entertainment devices can pose obstacles to simultaneous viewing of high-definition content.

In addition, the user interfaces associated with many entertainment devices can be difficult to use. For example, the process of identifying content from a particular source, selecting the content and having the content piped to a particular display often requires that users perform multiple operations. This convoluted process is time-consuming and cumbersome. Moreover, users often make mistakes when attempting to navigate through a complicated set of options in different menus, which frustrates users and degrades their user experience.

SUMMARY

The described embodiments include an audio/video (A/V) hub. This A/V hub includes: an antenna; an interface circuit that, during operation, communicates with a portable electronic device and an A/V display device; and a control circuit coupled to the interface circuit. During operation, the control circuit receives, via the interface circuit, user-interface activity information from the portable electronic device that specifies user selection of a content source. Then, the control circuit provides, via the interface circuit, a request for high-definition multimedia-interface (HDMI) content to the content source based on the user selection. Moreover, the control circuit receives, via the interface circuit, the HDMI content from the content source. Next, the control circuit provides the HDMI content and display instructions to the A/V display device as frames with the HDMI content are received from the content source, so that the HDMI content is displayed on a display in the A/V display device. Note that the display instructions specify that the HDMI content is to be displayed in a tiled window on the display while other HDMI content from another content source is displayed on the display.

The A/V hub may include a port that is coupled to the interface circuit and the A/V display device. This port may be compatible with an HDMI standard.

Moreover, the user selection may involve activation of a virtual command icon (such as activation of only a single virtual command icon). Alternatively, the user selection may involve activation of a physical button (such as activation of only a single physical button). In some embodiments, during operation the control circuit: generates user-interface information that specifies a user interface that includes one or more virtual command icons, including the virtual command icon, which are associated with content sources; and provides the user-interface information to the portable electronic device for display on a touch-sensitive display in the portable electronic device.

The request from the A/V hub in response to the activation of the virtual command icon or the physical button may include one or more commands or instructions for the content source, including selectively activating or turning on the content source (if the content source is not already activated or turned on) and/or specifying the HDMI content. Therefore, in some embodiments, the request may be based, at least in part, on device-state information about the content source.

Furthermore, the portable electronic devices may include: a remote control for the A/V hub; and/or a cellular telephone.

Additionally, during operation the control circuit may determine the display instructions based on a format of the display.

Note that providing the HDMI content and the display instructions may involve transcoding the HDMI content based on a format of the display.

In some embodiments, during operation the control circuit: receives, via the interface circuit, the other HDMI content from the other content source; and provides, via the interface circuit, the other HDMI content to the A/V display device, so that the other HDMI content is displayed on the display. Moreover, during operation the control circuit may provide second display instructions that specify how the other HDMI content is to be displayed on the display. Furthermore, during operation the control circuit may determine the second display instructions based on a format of the display.

In some embodiments, the control circuit includes: a processor; and a memory, coupled to the processor, which stores a program module that, during operation, is executed by the processor. The program module may include instructions for at least some operations performed by the control circuit.

Another embodiment provides a computer-program product for use with the A/V hub. This computer-program product includes instructions for at least some of the operations performed by the A/V hub.

Another embodiment provides a method for providing HDMI content. This method includes at least some of the operations performed by the A/V hub.

Another embodiment provides the A/V display device.

Another embodiment provides the portable electronic device.

This Summary is provided merely for purposes of illustrating some exemplary embodiments, so as to provide a basic understanding of some aspects of the subject matter described herein. Accordingly, it will be appreciated that the above-described features are merely examples and should not be construed to narrow the scope or spirit of the subject matter described herein in any way. Other features, aspects,

BRIEF DESCRIPTION OF THE FIGURES

Note that like reference numerals refer to corresponding parts throughout the drawings. Moreover, multiple instances of the same part are designated by a common prefix separated from an instance number by a dash.

DETAILED DESCRIPTION

Figure 1:
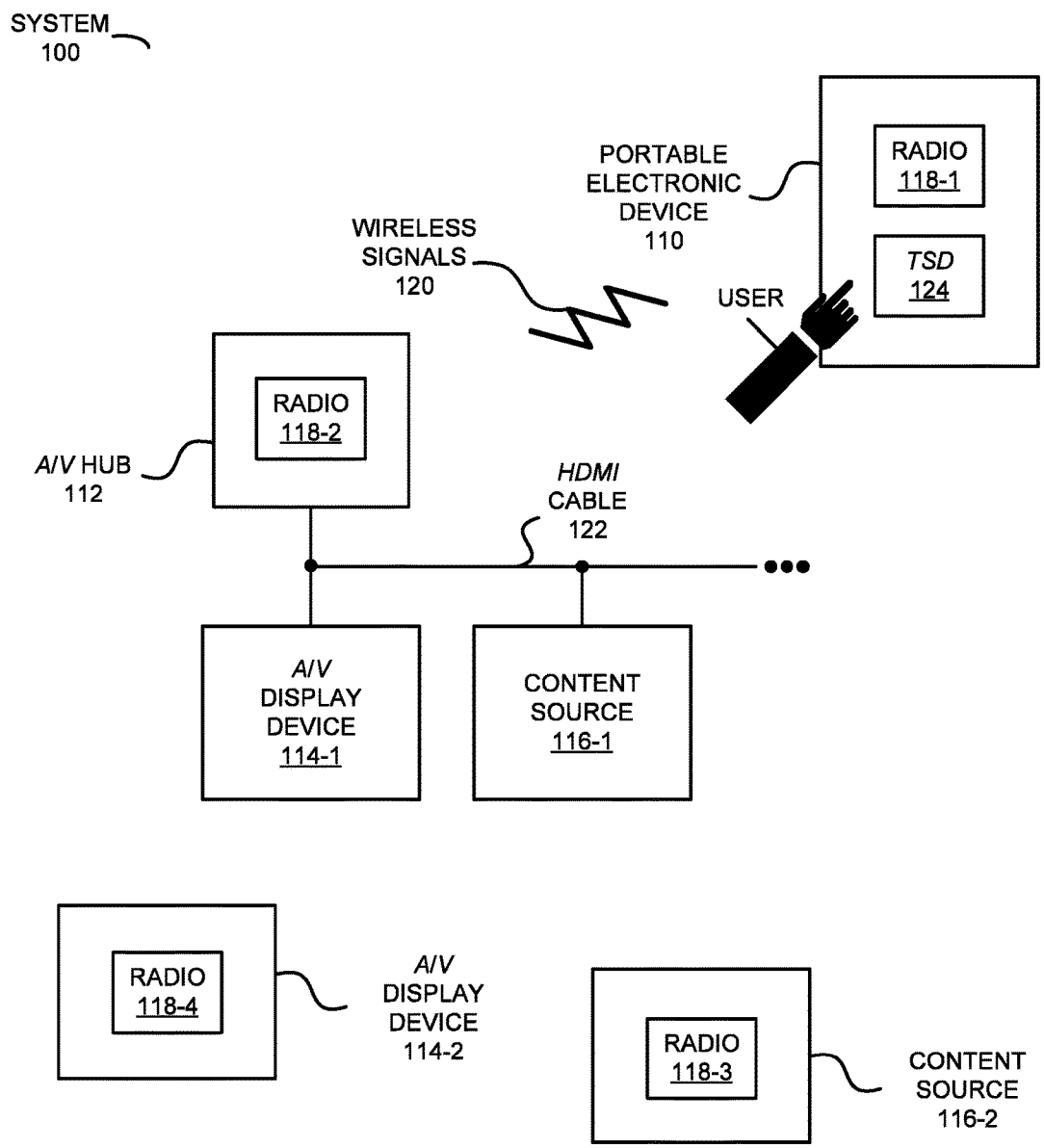
FIG. 1 is a block diagram illustrating a system with electronic devices wirelessly communicating in accordance with an embodiment of the present disclosure.

In a first group of embodiments, in response to receiving user-interface activity information from a portable electronic device (such as a cellular telephone or a remote control) that specifies user selection of a content source, an audio/video (A/V) hub provides a request for high-definition multimedia-interface (HDMI) content to the content source based on the user selection. When the A/V hub receives the HDMI content from the content source, the A/V hub provide the HDMI content and display instructions to an A/V display device (such as a consumer-electronic device, e.g., a television) as frames with the HDMI content are received from the content source, so that the HDMI content is displayed in a tiled window on the display in the A/V display device while other HDMI content from another content source is displayed on the display.

In a second group of embodiments, an A/V hub determines display instructions specifying information to be displayed on a display in an A/V display device that includes icons associated with content sources. These content sources are located at arbitrary locations in a structure, including locations external to an environment that includes the A/V hub and the A/V display device. Then, the A/V hub provides the display instructions to the A/V display device for display on the display.

In a third group of embodiments, an A/V hub determines display instructions specifying information to be displayed on a display in an A/V display device that includes icons associated with content sources. Then, the A/V hub provides the display instructions to the A/V display device for display on the display. In response to receiving a user selection of a content source based on activation of a single command feature in a portable electronic device that is associated with the content source, the A/V hub provides a request for HDMI content to the content source. When the A/V hub receives the HDMI content from the content source, the A/V hub provide the HDMI content and second display instructions to an A/V display device as frames with the HDMI content are received from the content source, so that the HDMI content is displayed in a tiled window on the display in the A/V display device.

In a fourth group of embodiments, in response to receiving user-interface activity information from a portable electronic device that specifies user instruction to cast HDMI content associated with a content source from a first A/V display device to a second A/V display device, an A/V hub accesses device-state information that specifies a current state of the second A/V display device. Then, the A/V hub performs the casting of the HDMI content from the first A/V display device to the second A/V display device using a dynamic number of operations based on the device-state information, so that the HDMI content is displayed on a display in the second A/V display device.

By dynamically adapting the displayed HDMI content in response to user selections, this display technique may make it easier for a user to control an entertainment device (such as the A/V hub, the A/V display device and/or one or more content sources) with fewer errors or mistakes. Moreover, by providing a simple and intuitive user interface in the portable electronic device and display instructions for the A/V display device, this display technique may make it easier for a user to: select HDMI content from different content sources, change how the HDMI content is displayed and/or where the HDMI content is displayed. Consequently, the display technique may reduce user frustration and/or may improve the user experience when using the portable electronic device, the A/V hub, the A/V display device and/or one or more content sources.

In the discussion that follows the portable electronic device, the A/V hub, the A/V display device, the one or more content sources, and/or an entertainment device (such as a consumer-electronic device) may include radios that communicate packets or frames in accordance with one or more communication protocols, such as: an Institute of Electrical and Electronics Engineers (IEEE) 802.11 standard (which is sometimes referred to as 'Wi-Fi®,' from the Wi-Fi® Alliance of Austin, Tex.), Bluetooth® (from the Bluetooth Special Interest Group of Kirkland, Wash.), a cellular-telephone communication protocol, a near-field-communication standard or specification (from the NFC Forum of Wakefield, Mass.), and/or another type of wireless interface. In the discussion that follows, Wi-Fi is used as an illustrative example. For example, the cellular-telephone communication protocol may include or may be compatible with: a $2^{nd}$ generation of mobile telecommunication technology, a $3^{rd}$ generation of mobile telecommunications technology (such as a communication protocol that complies with the International Mobile Telecommunications-2000 specifications by the International Telecommunication Union of Geneva, Switzerland), a $4^{th}$ generation of mobile telecommunications technology (such as a communication protocol that complies with the International Mobile Telecommunications Advanced specification by the International Telecommunication Union of Geneva, Switzerland), and/or another cellular-telephone communication technique. In some embodiments, the communication protocol includes Long Term Evolution or LTE. However, a wide variety of communication protocols may be used. In addition, the communication may occur via a wide variety of frequency bands. Note that the portable electronic device, the A/V hub, the A/V display device, the one or more content sources, and/or an entertainment device may communicate using infra-red communication that is compatible with an infra-red communication standard (including unidirectional or bidirectional infra-red communication).

Communication among electronic devices is shown in FIG. 1, which presents a block diagram illustrating a system 100 with a portable electronic device 110 (such as a remote control or a cellular telephone), an A/V hub 112, one or more A/V display devices 114 (such as a television, a monitor, a computer and, more generally, a display associated with an electronic device) and one or more content sources 116 (e.g., a radio receiver, a video player, a satellite receiver, an access point that provides a connection to a wired network such as the Internet, a media or a content source, a consumer-electronic device, an entertainment device, a set-top box, over-the-top content delivered over the Internet or a network without involvement of a cable, satellite or multiple-system operator, etc.). (Note that A/V hub 112, the one or more A/V display devices 114, and the one or more content sources 116 are sometimes collectively referred to as 'components' in system 100. However, A/V hub 112, the one or more A/V display devices 114, and the one or more content sources 116 are sometimes referred to as entertainment devices.) In particular, portable electronic device 110 and A/V hub 112 may communicate with each other using wireless communication, and A/V hub 112 and other components in system 100 (such as the one or more A/V display devices 114 and the one or more content sources 116) may communicate using wireless and/or wired communication. During the wireless communication, these electronic devices may wirelessly communicate while: transmitting advertising frames on wireless channels, detecting one another by scanning wireless channels, establishing connections (for example, by transmitting association requests), and/or transmitting and receiving packets or frames (which may include the association requests and/or additional information as payloads, such as user-interface information, device-state information, user-interface activity information, data, A/V content, etc.).

Figure 24:
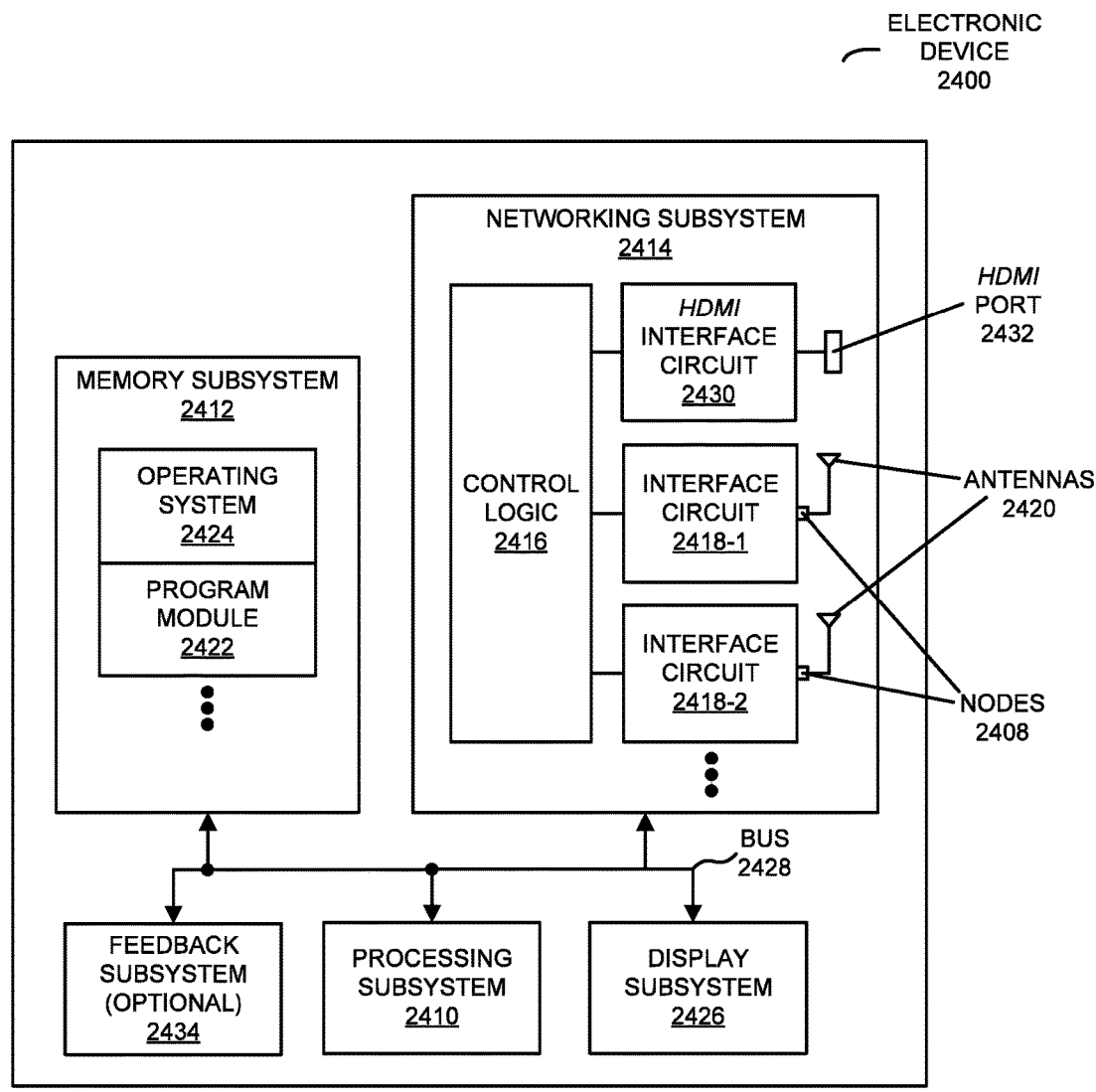
FIG. 24 is a block diagram illustrating one of the electronic devices of FIG. 1 in accordance with an embodiment of the present disclosure.

As described further below with reference to FIG. 24, portable electronic device 110, A/V hub 112, the one or more A/V display devices 114 and the one or more content sources 116 may include subsystems, such as: a networking subsystem, a memory subsystem and a processor subsystem. In addition, portable electronic device 110 and A/V hub 112, and optionally one or more of the one or more A/V display devices 114 and/or the one or more content sources 116, may include radios 118 in the networking subsystems. (Note that radios 118 may be instances of the same radio or may be different from each other.) More generally, portable electronic device 110 and A/V hub 112 (and optionally one or more of the one or more A/V display devices 114 and/or the one or more content sources 116) can include (or can be included within) any electronic devices with the networking subsystems that enable portable electronic device 110 and A/V hub 112 (and optionally one or more of A/V display devices 114 and/or the one or more content sources 116) to wirelessly communicate with each other. This wireless communication can comprise transmitting advertisements on wireless channels to enable electronic devices to make initial contact or detect each other, followed by exchanging subsequent data/management frames (such as association requests and responses) to establish a connection, configure security options (e.g., Internet Protocol Security), transmit and receive packets or frames via the connection, etc.

As can be seen in FIG. 1, wireless signals 120 (represented by a jagged line) are transmitted from radio 118-1 in portable electronic device 110. These wireless signals are received by at least A/V hub 112. In particular, portable electronic device 110 may transmit packets. In turn, these packets may be received by a radio 118-2 in A/V hub 112. This may allow portable electronic device 110 to communicate information to A/V hub 112. While FIG. 1 illustrates portable electronic device 110 transmitting packets, note that portable electronic device 110 may also receive packets from A/V hub 112.

In the described embodiments, processing of a packet or frame in portable electronic device 110 and A/V hub 112 (and optionally one or more of the one or more A/V display devices 114 and/or the one or more content sources 116) includes: receiving wireless signals 120 with the packet or frame; decoding/extracting the packet or frame from received wireless signals 120 to acquire the packet or frame; and processing the packet or frame to determine information contained in the packet or frame (such as the information associated with a data stream). For example, the information from portable electronic device 110 may include user-interface activity information associated with a user interface displayed on touch-sensitive display 124 in portable electronic device 110, which a user of portable electronic device 110 uses to control A/V hub 112, the one or more A/V display devices 114 and/or one of the one or more content sources 116. (In some embodiments, instead of or in additional to touch-sensitive display 124, portable electronic device 110 includes a use interface with physical knobs and/or buttons that a user can use to control A/V hub 112, the one or more A/V display devices 114 and/or one of the one or more content sources 116.) Alternatively, the information from A/V hub 112 may include device-state information about a current device state of one or more of A/V display devices 114 or one of the one or more content sources 116 (such as on, off, play, rewind, fast forward, a selected channel, selected content, a content source, etc.), or may include user-interface information for the user interface (which may be dynamically updated based on the device-state information and/or the user-interface activity information). Furthermore, the information from A/V hub 112 and/or one of the one or more content sources 116 may include audio and video that are displayed on one or more of A/V display devices 114, as well as display instructions that specify how the audio and video are to be displayed. (However, as noted previously, the audio and video may be communicated between components in system 100 via wired communication. Therefore, as shown in FIG. 1, there may be a wired cable or link, such as a high-definition multimedia-interface (HDMI) cable 122, between A/V hub 112 and A/V display device 114-1.)

Note that the communication between portable electronic device 110 and A/V hub 112 (and optionally one or more of the one or more A/V display devices 114 and/or the one or more content sources 116) may be characterized by a variety of performance metrics, such as: a data rate, a data rate for successful communication (which is sometimes referred to as a 'throughput'), an error rate (such as a packet error rate, or a retry or resend rate), a mean-square error of equalized signals relative to an equalization target, intersymbol interference, multipath interference, a signal-to-noise ratio, a width of an eye pattern, a ratio of number of bytes successfully communicated during a time interval (such as 1-10 s) to an estimated maximum number of bytes that can be communicated in the time interval (the latter of which is sometimes referred to as the 'capacity' of a channel or link), and/or a ratio of an actual data rate to an estimated data rate (which is sometimes referred to as 'utilization'). Moreover, the performance during the communication associated with different channels may be monitored individually or jointly (e.g., to identify dropped packets).

The communication between portable electronic device 110 and A/V hub 112 (and optionally one or more of the one or more A/V display devices 114 and/or the one or more content sources 116) in FIG. 1 may involve one or more independent, concurrent data streams in different wireless channels (or even different communication protocols, such as different Wi-Fi communication protocols) in one or more connections or links, which may be communicated using multiple radios. Note that the one or more connections or links may each have a separate or different service set identifier on a wireless network in system 100 (which may be a proprietary network or a public network). Moreover, the one or more concurrent data streams may, on a dynamic or packet-by-packet basis, be partially or completely redundant to improve or maintain the performance metrics even when there are transient changes (such as interference, changes in the amount of information that needs to be communicated, movement of portable electronic device 110, etc.), and to facilitate services (while remaining compatible with the communication protocol, e.g., a Wi-Fi communication protocol) such as: channel calibration, determining of one or more performance metrics, performing quality-of-service characterization without disrupting the communication (such as performing channel estimation, determining link quality, performing channel calibration and/or performing spectral analysis associated with at least one channel), seamless handoff between different wireless channels, coordinated communication between components, etc. These features may reduce the number of packets that are resent, and, thus, may decrease the latency and avoid disruption of the communication and may enhance the experience of one or more users or viewers of content on the one or more A/V display devices 114.

As noted previously (and described further below with reference to FIG. 6), a user may control A/V hub 112, one or more of the one or more A/V display devices 114 and/or one of the one or more content sources 116 via the user interface displayed on touch-sensitive display 124 on portable electronic device. In particular, at a given time, the user interface may include one or more virtual icons that allow the user to activate, deactivate or change functionality or capabilities of A/V hub 112, one or more of A/V display devices 114 and/or one or more of content sources 116. For example, a given virtual icon in the user interface may have an associated strike area on a surface of touch-sensitive display 124. If the user makes and then breaks contact with the surface (e.g., using one or more fingers or digits, or using a stylus) within the strike area, portable electronic device 110 (such as a processor executing a program module) may receive user-interface activity information indicating activation of this command or instruction from a touch-screen input/output (I/O) controller, which is coupled to touch-sensitive display 124. (Alternatively, touch-sensitive display 124 may be responsive to pressure. In these embodiments, the user may maintain contact with touch-sensitive display 124 with an average contact pressure that is usually less than a threshold value, such as 10-20 kPa, and may activate a given virtual icon by increase the average contact pressure with touch-sensitive display 124 above the threshold value.) In response, the program module may instruct an interface circuit in portable electronic device 110 to wirelessly communicate the user-interface activity information indicating the command or instruction to A/V hub 112, and A/V hub 112 may communicate the command or the instruction to the target component in system 100 (such as A/V display device 114-1). This instruction or command may result in A/V display device 114-1 turning on or off, displaying content from a particular source, performing a trick mode of operation (such as fast forward, reverse, fast reverse or skip), etc.

One problem with using existing remote controls to control the operation of another component or entertainment device is that the remote control does not receive any feedback from the entertainment device. For example, many existing remote controls use infra-red communication. However, typically existing infra-red communication protocols are unidirectional or one-way communication, i.e., from a remote control to the entertainment device. Consequently, the remote control usually does not have any knowledge of the effects of the commands or instructions that are communicated to the entertainment device. In particular, the remote control is typically unaware of a current state of the entertainment device, such as whether the entertainment device is in: a power-on state, a power-off state, a playback state, a trick-mode state (such as fast forward, fast reverse, or skip), a pause state, a standby (reduced-power) state, a record state, a state in which content associated with a given content source (such as cable television, a satellite network, a web page on the Internet, etc.) is received or provided, and/or another state. (Note that one or more of the states may be nested or concurrent with each other, such as the power-on state and the playback state.) By operating blindly in this way, existing remote control are unable to leverage knowledge of the current state of the entertainment device to improve the user experience.

This problem is addressed in system 100. In particular, as described further below with reference to FIGS. 22 and 23, A/V hub 112 may determine the current state of one or more of the components in system 100, such as the current state of A/V display device 114-1 and/or one of the one or more content sources 116. This device-state information may be determined by A/V hub 112 using hardware and/or software, and A/V hub 112 may determine the device-state information even for legacy entertainment devices that are only capable of receiving commands or instructions (i.e., that are only capable of unidirectional communication). For example, as described further below with reference to FIGS. 22 and 23, whether or not a given component or entertainment device in system 100 is electrically coupled to A/V hub 112 may be determined using a state-detection circuit that detects whether there is electrical coupling between the entertainment device and an input connector to A/V hub 112 (such as an HDMI connector or port that can be electrically coupled to HDMI cable 122). If the electrical coupling is detected, the type of the given entertainment device (such as a television, a DVD player, a satellite receiver, etc.) and/or the manufacturer or provider of the given entertainment device may be determined by A/V hub 112 by providing a series of commands or instructions to the given entertainment device (e.g., such as commands or instructions that are specific to a particular type of entertainment device, specific to a particular manufacturer, and/or consumer-electronics-control commands in the HDMI standard or specification), and then monitoring, as a function of time, changes in a data stream (as indicated by the number of packets or frames and/or the payloads in the packets or frames) to and/or from the given entertainment device to see if there was a response to a particular command or instruction. Moreover, the state-detection circuit may determine whether the given entertainment device is in the power-on state or the power-off state by monitoring a voltage, a current and/or an impedance on, through or associated with one or more pins in the input connector. Alternatively or additionally, A/V hub 112 may determine whether the given entertainment device is in the power-on state or the power-off state by monitoring, as a function of time, the data stream (as indicated by the number of packets or frames and/or the payloads in the packets or frames) to and/or from the given entertainment device. Similarly, A/V hub 112 may determine the current state of the given entertainment device, such as whether the given entertainment device responded to a command or instruction that was provided to the given entertainment device by A/V hub 112, by monitoring, as a function of time, changes in the data stream (as indicated by the number of packets or frames and/or the payloads in the packets or frames) to and/or from the given entertainment device. Thus, the device-state information for the given entertainment device determined by A/V hub 112 may include: presence or absence information (such as whether there is electrical coupling or a wireless connection with the given entertainment device), identity information (such as the type of the given entertainment device and/or the manufacturer of the given entertainment device) and/or the current state.

Using the device-state information A/V hub 112 and/or portable electronic device 110 may dynamically adapt the user interface displayed on touch-sensitive display 124 on portable electronic device 110. For example, A/V hub 112 may provide, via radio 118-2, device-state information to portable electronic device 110 specifying a current state of the given entertainment device. (Thus, this feedback technique may include bidirectional or two-way communication between A/V hub 112 and portable electronic device 110.) After radio 118-1 receives the device-state information, portable electronic device 110 (such as a program module executed in an environment, e.g., an operating system, in portable electronic device 110) may generate a user interface that includes one or more virtual command icons associated with the current state and one or more related states of the given entertainment device. Note that the one or more related states may be related to the current state in a state diagram (which may be stored in memory in portable electronic device 110) by corresponding operations that transition the given entertainment device from the current state to the one or more related states. Then, portable electronic device 110 may display the user interface on touch-sensitive display 124.

In some embodiments, A/V hub 112 provides information specifying the type of the given entertainment device, the manufacturer of the given entertainment device, and/or context information that specifies a context of content (such as A/V content) displayed on the entertainment device (such as A/V display device 114-1). For example, the context may include a type of the content (such as sports, television, a movie, etc.), a location in the content (such as a timestamp, an identifier of a sub-section in the content and/or a proximity to a beginning or an end of the content), etc. In these embodiments, the one or more virtual command icons (and, thus, the user interface) may be based on the type of the given entertainment device, the manufacturer and/or the context. Thus, only virtual command icons that are relevant to the given entertainment device, the manufacturer and/or the context may be included in the user interface.

Moreover, when the user activates one of the virtual command icons in the user interface, the touch-screen I/O controller in portable electronic device 110 may provide user-interface activity information specifying activation of a virtual command icon in the one or more virtual command icons, where the activation of the virtual command icon specifies a transition of the given entertainment device from the current state to a new current state in the state diagram. As noted previously, the activation of the virtual command icon may involve a user of portable electronic device 110 contacting touch-sensitive display 124 within a strike area of the virtual command icon and then releasing the contact. In response to receiving the user-interface activity information, portable electronic device 110 may: modify the user interface to change the one or more virtual command icons based on the new current state; and display the modified user interface on touch-sensitive display 124. Note that portable electronic device 110 may wait to change the one or more virtual command icons until the device-state information received from A/V hub 112 indicates that the given entertainment device has transitioned to the new current state in response to a command or an instruction associated with the activation of the one of the virtual command icons. Thus, portable electronic device 110 may repeatedly perform the generating and the displaying operations so that the user interface is dynamically updated as the current state changes.

Alternatively or additionally, instead of portable electronic device 110 generating the user interface, A/V hub 112 may generate user-interface information that specifies the user interface (or instructions specifying objects or graphical information in the user interface) based on the one or more related states in the state diagram (which may be stored in memory in A/V hub 112) and one or more of: the device-state information, the type of the given entertainment device, the manufacturer of the given entertainment device, the context, user-interface activity information specifying activation (by the user) of one of the virtual command icons in the user interface (which may be received, via radios 118, from portable electronic device 110), and/or a display format in portable electronic device 110. Then, A/V hub 112 may provide, via radios 118, the user-interface information to portable electronic device 110 for display on touch-sensitive display 124.

In this way, the user interface may be dynamically updated as the components in system 100 respond to commands or instructions received from portable electronic device 110 and/or A/V hub 112, so that the currently relevant one or more virtual icons are included in the user interface. This capability may simplify the user interface and make it easier for the user to navigate through and/or use the user interface.

Moreover, as described further below with reference to FIGS. 18 and 19, the device-state information may be used by A/V hub 112 to dynamically adapt or change a number of operations needed or used to cast HDMI content from one A/V display device to another A/V display device, such as from A/V display device 114-1 to A/V display device 114-2 (which may be in the same room or a different room in the environment that includes A/V hub 112). (While HDMI content is used as an illustrative example, in other embodiments content that is compatible with another format or standard is used in the embodiments of the display technique, including: H.264, MPEG-2, a QuickTime video format, MPEG-4 and/or MP4. Moreover, the video mode of the content may be 720p, 1080i, 1080p, 1440p, 2000, 2160p, 2540p, 4000p and/or 4320p) In particular, in response to user-interface activity information received from portable electronic device 110 that specifies user instruction to cast HDMI content associated with a content source (such as content source 116-1) from A/V display device 114-1 to A/V display device 114-2 (such as user activation of a virtual command icon in a user interface), A/V hub 112 may access device-state information that specifies a current state of A/V display device 114-2. Then, A/V hub 112 may perform the casting of the HDMI content from A/V display device 114-1 to A/V display device 114-2 (and, in particular, from the content source to A/V display device 114-2) using a dynamic number of operations based on the device-state information, so that the HDMI content is displayed on a display in A/V display device 114-2. For example, when the device-state information indicates that A/V display device 114-2 is powered on, a power-on operation may be excluded from the dynamic number of operations. Alternatively or additionally, when the device-state information indicates that A/V display device 114-2 is set to receive the HDMI content from content source 116-1, an operation to set A/V display device 114-2 to receive the HDMI content from content source 116-1 may be excluded from the dynamic number of operations. Thus, based on device-state awareness, the display technique may adapt or change the dynamic number of operations so that operations such as casting are performed efficiently (i.e., are less time-consuming).

Figure 2:
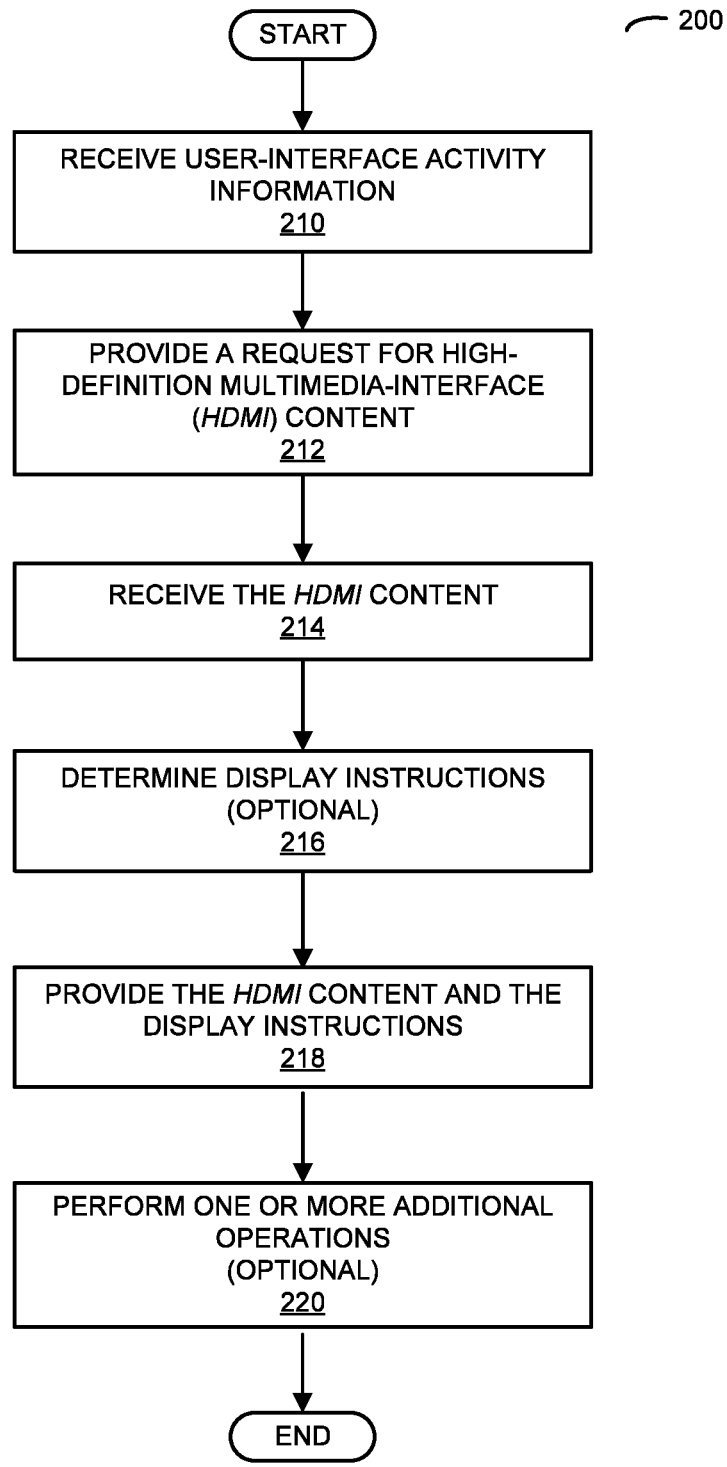
FIG. 2 is a flow diagram illustrating a method for providing high-definition multimedia-interface (HDMI) content in accordance with an embodiment of the present disclosure.

Furthermore, as described further below with reference to FIGS. 2 and 3, in response to user-interface activity information received from portable electronic device 110 that specifies a user selection of a content source (such as content source 116-1), A/V hub 112 may provide a request for HDMI content to content source 116-1 based on the user selection. When A/V hub 112 receives the HDMI content from content source 116-1, A/V hub 112 may provide the HDMI content and display instructions to A/V display device 114-1 as frames with the HDMI content are received from content source 116-1 (e.g., in real time), so that the HDMI content is displayed in a tiled window on the display in A/V display device 114-1 while other HDMI content from another content source (such as content source 116-2) is displayed on the display. Note that a 'tiled window' may include window in at least a portion of the display area that does not overlap another window, but that presents the HDMI content overlaid on a background of the window. (Alternatively or additionally, the HDMI content may be displayed in a cascaded or overlapped window that at least partially overlaps or that is partially overlapped by another window.) Thus, the display technique may allow HDMI content to be presented in a tiled window in real time (such as frames with the HDMI content are received from content source 116-1).

In some embodiments, as described further below with reference to FIGS. 4 and 5, A/V hub 112 determines display instructions specifying information to be displayed on the display in an A/V display device (such as A/V display device 114-1) that includes icons associated with content sources (such as content sources 116). Then, A/V hub 112 provides the display instructions to A/V display device 114-1 for display on the display. For example, the information to be displayed may specify content (such as HDMI content) that is displayed on the display and where the content is displayed (such as one or more tiled windows). Therefore, the information to be displayed may be based on a format of the display, such as: a display size, display resolution, display aspect ratio, display contrast ratio, a display type, etc. Then, in response to receiving a user selection of content source 116-1 (or user-interface activity information that specifies the user selection) based on activation of a single command feature in portable electronic device 110 that is associated with content source 116-1 (such as a virtual command icon in a user interface displayed on portable electronic device 110), A/V hub 112 may provide a request for HDMI content to content source 116-1. When A/V hub 112 receives the HDMI content from content source 116-1, A/V hub 112 may provide the HDMI content and second display instructions to A/V display device 114-1 as frames with the HDMI content are received from content source 116-1, so that the HDMI content is displayed in a tiled window on the display in A/V display device 114-1. For example, the information to be displayed may specify that the HDMI content is displayed on the display in a new tiled window. Thus, the display technique may allow the new tiled window to be created in the display based on selection or activation of the single command feature without requiring further action or additional operations be performed by the user.

Additionally, as described further below with reference to FIGS. 14-17, A/V hub 112 may determine the display instructions specifying the information to be displayed on the display in an A/V display device (such as A/V display device 114-1) that includes icons associated with content sources 116. These content sources may be located at arbitrary locations in a structure (such as one or more rooms in a building), including locations external to an environment (such as at least a portion of a room in the building, which may be different than the one or more rooms) that includes A/V hub 112 and A/V display device 114-1. Then, A/V hub 112 provides the display instructions to A/V display device 114-1 for display on the display. Thus, leveraging the wired and/or wireless network(s) associated with A/V hub 112, the display technique may allow a wide variety of content sources provided by different providers, and which are locally or remoted located, to be displayed on A/V display device 114-1.

In these ways, the display technique may allow a user to control the A/V hub, one or more A/V display devices and/or one or more content sources with less effort (such as in less time, with fewer operations and/or with less confusion), and to do so with fewer errors or mistakes. Consequently, the display technique may reduce user frustration and/or may improve the user experience when using the portable electronic device, the A/V hub, the one or more A/V display devices and/or the one or more content sources.

Although we describe the network environment shown in FIG. 1 as an example, in alternative embodiments, different numbers or types of electronic devices may be present. For example, some embodiments comprise more or fewer electronic devices. As another example, in another embodiment, different electronic devices are transmitting and/or receiving packets or frames. While portable electronic device 110 and A/V hub 112 are illustrated with a single instance of radios 118, in other embodiments portable electronic device 110 and A/V hub 112 (and optionally one or more of A/V display device 114-1 and/or the one or more content sources 116) may include multiple radios.

We now describe embodiments of a display technique. FIG. 2 presents a flow diagram illustrating method 200 for providing HDMI content, which may be performed by an A/V hub, such as A/V hub 112 (FIG. 1). During operation, the A/V hub (such as a control circuit or control logic, e.g., a processor executing a program module and/or or a circuit) receives, via an interface circuit in the A/V hub, user-interface activity information (operation 210) from a portable electronic device, where the user-interface activity information specifies user selection of a content source. For example, the user selection may involve activation of a virtual command icon associated with the content source, which is displayed in a user interface on the portable electronic device. Alternatively, the user selection may involve activation of a physical button associated with the content source, which is included in the portable electronic device. Note that the A/V hub may optionally: generate user-interface information that specifies the user interface that includes one or more virtual command icons, including the virtual command icon, which are associated with one or more content sources; and provides the user-interface information to the portable electronic device for display on a touch-sensitive display in the portable electronic device. However, in other embodiments the user-interface information is optionally generated by the portable electronic device.

Then, the A/V hub provides, via the interface circuit, a request for high-definition multimedia-interface (HDMI) content (operation 212) to the content source based on the user selection. Moreover, the A/V hub receives, via the interface circuit, the HDMI content (operation 214) from the content source, and the A/V hub may optionally determine the display instructions (operation 216) based on a format of the display. The request from the A/V hub in response to the activation of the virtual command icon or the physical button may include one or more commands or instructions for the content source, including selectively activating or turning on the content source (if the content source is not already activated or turned on) and/or specifying the HDMI content. Therefore, in some embodiments, the request may be based, at least in part, on device-state information about the content source.

Next, the A/V hub provides, via the interface circuit, the HDMI content and display instructions (operation 218) to an A/V display device as frames with the HDMI content are received from the content source, so that the HDMI content is displayed on a display in the A/V display device. For example, providing the HDMI content and the display instructions may involve transcoding the HDMI content based on a format of the display. Note that the display instructions specify that the HDMI content is to be displayed in a tiled window on the display while other HDMI content from another content source is displayed on the display.

In some embodiments, the A/V hub optionally performs one or more additional operations (operation 220). For example, the A/V hub may optionally: receive, via the interface circuit, the other HDMI content from the other content source; and provide, via the interface circuit, the other HDMI content to the A/V display device, so that the other HDMI content is displayed on the display. Moreover, the A/V hub may optionally provide second display instructions that specify how the other HDMI content is to be displayed on the display. Furthermore, the A/V hub may optionally determine the second display instructions based on a format of the display.

Note that method 200 may address security issues associated with the concurrent display of the tiled window(s). For example, the HDMI content may be displayed in the tiled window on the display while the other HDMI content from the other content source is displayed on the display without a risk of hacking (such as intentional communication of malicious content, such as malicious software, malware or a so-called 'virus').

Figure 3:
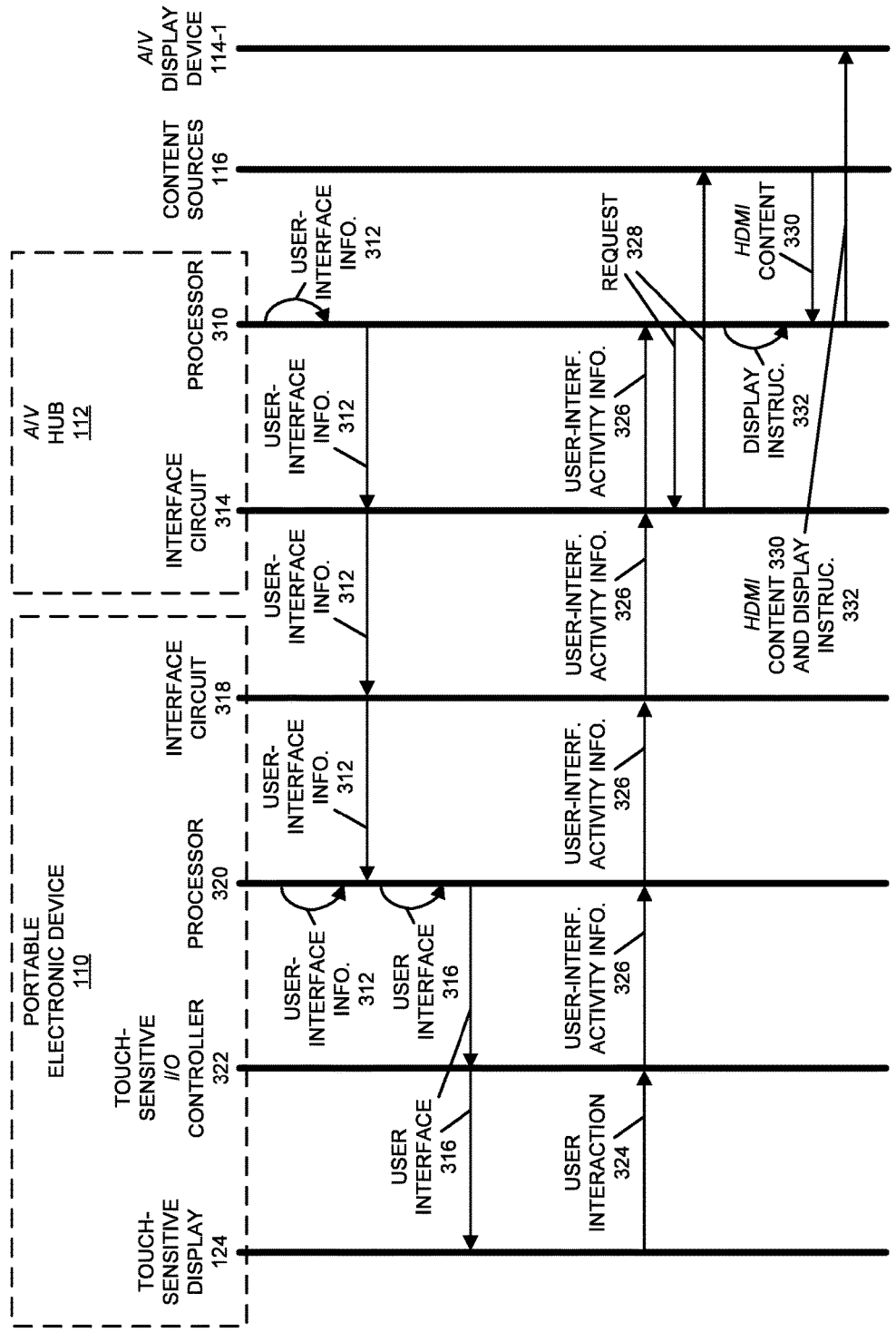
FIG. 3 is a drawing illustrating communication among the electronic devices in FIG. 1 in accordance with an embodiment of the present disclosure.

FIG. 3 presents a drawing illustrating communication among the electronic devices in FIG. 1, which presents a drawing illustrating communication between portable electronic device 110, A/V hub 112 and A/V display device 114-1. In particular, processor 310 may optionally generate user-interface information 312 that specifies a user interface that includes one or more virtual command icons, including a virtual command icon, which are associated with content sources 116. Then, processor 310 may optionally provide, via interface circuit 314, user-interface information 312 to portable electronic device 110. After receiving user-interface information 312, portable electronic device 110 may optionally display associated user interface 316 on a touch-sensitive display (such as touch-sensitive display 124 in FIG. 1) in portable electronic device 110. However, in other embodiments user-interface information 312 is optionally generated by portable electronic device 110.

For example, interface circuit 318 in portable electronic device 110 may receive user-interface information 312, which is then provided to processor 320. Alternatively, processor 320 may generate user-interface information 312. Then, based on user-interface information 312, processor 320 may provide information specifying user interface 316 to touch-sensitive input/output (I/O) controller 322, which provides the information specifying user interface 316 to touch-sensitive display 124.

Moreover, touch-sensitive display 124 may provide to information specifying user interaction 324 to touch-sensitive I/O controller 322. In turn, touch-sensitive I/O controller 322 may interpret the information specifying user interaction 324 to determine user-interface activity information 326. For example, user-interface activity information 326 may specify user selection of one of content sources 116, such as user activation of the virtual command icon associated with the one of content sources 116. Touch-sensitive I/O controller 322 may provide user-interface activity information 326 to processor 320, which may provide user-interface activity information 326 to interface circuit 318.

Next, portable electronic device 110 (such as via interface circuit 318) may provide user-interface activity information 326 to A/V hub 112. After receiving user-interface activity information 326, interface circuit 314 may provide user-interface activity information 326 to processor 310. In response, processor 310 may instruct interface circuit 314 to provide request 328 for HDMI content 330 to the one of content sources 116. In addition, processor 310 may optionally determine display instructions 332 based on a format of a display in A/V display device 114-1. Alternatively, display instructions 332 may be predetermined or predefined.

After receiving request 328, the one of content sources 116 may provide HDMI content 330 to A/V hub 112. Next, interface circuit 314 may provide HDMI content 330 and/or display instructions 332 (which may be provide differentially when there or changes or regularly, such in each packet or in one of every N packets) to A/V display device 114-1 as frames with HDMI content 330 are received from the one of content sources 116, so that HDMI content 330 is displayed on the display in A/V display device 114-1. (Alternatively, in some embodiments interface circuit 314 provides HDMI content 330 to processor 310, which instructs interface circuit 314 to provide HDMI content 330 and display instructions 332 to A/V display device 114-1 as frames with HDMI content 330 are received from the one of content sources 116.)

Note that display instructions 332 may specify that HDMI content 330 is to be displayed in a tiled window on the display while additional HDMI content from another of content sources 116 is displayed on the display. For example, A/V hub 112 may optionally: receives, via interface circuit 314, the additional HDMI content from the other of content sources 116; and provides, via interface circuit 314, the additional HDMI content to A/V display device 114-1, so that additional HDMI content is displayed on the display. Moreover, processor 310 may optionally determine additional display instructions that specify how the additional HDMI content is to be displayed on the display based on a format of the display. Furthermore, interface circuit 314 may optionally provide the additional display instructions to A/V display device 114-1.

The user may create, modify or discontinue a tiled window by activating a single command feature in a user interface displayed on the portable electronic device. This is shown in FIG. 4, which presents a flow diagram illustrating a method 400 for providing HDMI content. Note that this method may be performed by an A/V hub, such as A/V hub 112 (FIG. 1). During operation, the A/V hub (such as a control circuit or control logic, e.g., a processor executing a program module and/or or a circuit) determines display instructions (operation 410) specifying information to be displayed on a display in an A/V display device, where the information to be displayed includes icons associated with content sources. Then, the A/V hub provides, via an interface circuit in the A/V hub, the display instructions (operation 412) to the A/V display device for display on the display. Moreover, the A/V hub receives, via the interface circuit, user-interface activity information (operation 414) from a portable electronic device, where the user-interface activity information specifies user selection of a content source based on activation of a single command feature in the portable electronic device that is associated with the content source. For example, the single command feature may include a virtual command icon displayed in the user interface on a touch-sensitive display in the portable electronic device. Alternatively, the single command feature may include a physical button. Note that the A/V hub may optionally: generate user-interface information that specifies the user interface that includes one or more virtual command icons, including the virtual command icon, which are associated with the content sources; and provides the user-interface information to the portable electronic device for display on the touch-sensitive display in the portable electronic device. However, in other embodiments the user-interface information is optionally generated by the portable electronic device.

Next, the A/V hub provides, via the interface circuit, a request for HDMI content (operation 416) to the content source based on the user selection, and receives, via the interface circuit, the HDMI content (operation 418) from the content source. In some embodiments, the A/V hub optionally determines second display instructions (operation 420) based on a format of the display. The request from the A/V hub in response to the activation of the virtual command icon or the physical button may include one or more commands or instructions for the content source, including selectively activating or turning on the content source (if the content source is not already activated or turned on) and/or specifying the HDMI content. Therefore, in some embodiments, the request may be based, at least in part, on device-state information about the content source.

Furthermore, the A/V hub provides the HDMI content and the second display instructions (operation 422) to the A/V display device as frames with the HDMI content are received from the content source, so that the HDMI content is displayed on a display in the A/V display device, where the second display instructions specify that the HDMI content is to be displayed in a tiled window on the display. For example, providing the HDMI content and the second display instructions may involve transcoding the HDMI content based on a format of the display.

Additionally, the A/V hub may optionally perform one or more additional operations (operation 424). For example, the A/V hub may: receive, via the interface circuit, second user-interface activity information from the portable electronic device, where the second user-interface activity information specifies user de-activation of the content source based on activation of the single command feature in the portable electronic device that is associated with the content source; provide, via the interface circuit, a request to discontinue the HDMI content to the content source; and provide third display instructions to the A/V display device, so that display of the tiled window on the display is discontinued.

Alternatively or additionally, the A/V hub may: receive, via the interface circuit, third user-interface activity information from the portable electronic device, where the third user-interface activity information specifies user selection of a second content source based on activation of a second single command feature in the portable electronic device that is associated with the second content source; provide, via the interface circuit, a request for second HDMI content to the second content source; receive, via the interface circuit, the second HDMI content from the second content source; and provide the second HDMI content and third display instructions to the A/V display device as frames with the second HDMI content are received from the second content source, so that the second HDMI content is displayed on the display in the A/V display device concurrently with the HDMI content in the titled window. Note that the third display instructions specify that the second HDMI content is to be displayed in a second tiled window on the display.

Furthermore, subsequently, the A/V hub may receive, via the interface circuit, fourth user-interface activity information from the portable electronic device that specifies user selection of one of the tilted window and the second tiled window. In response, the A/V hub may provide fourth display instructions to the A/V display device, so that given HDMI content, which is one of the HDMI content and the second HDMI content, is displayed in a central tiled window on the display and display of a given tiled window, which is one of the tiled window and the second tiled window, is discontinued.

Figure 5:
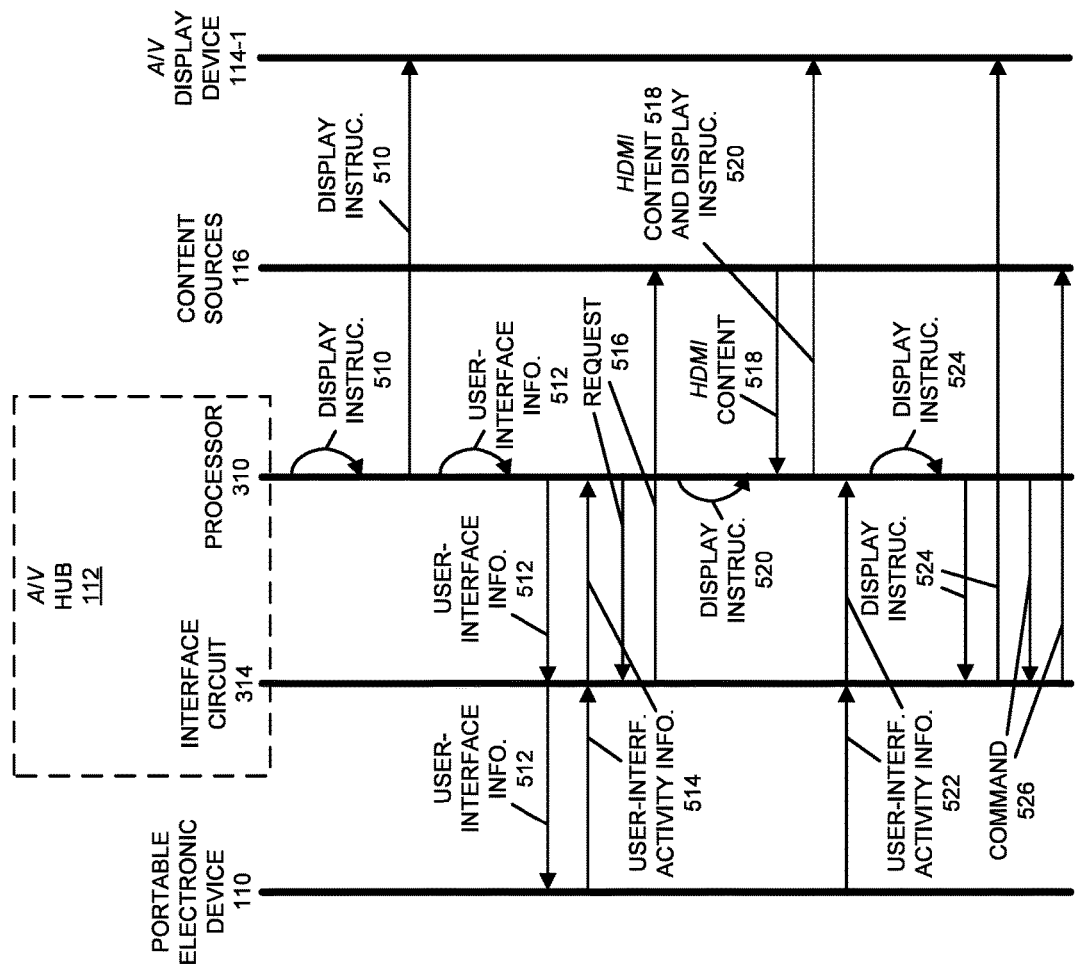
FIG. 5 is a drawing illustrating communication among the electronic devices in FIG. 1 in accordance with an embodiment of the present disclosure.

FIG. 5 presents a drawing illustrating communication among the electronic devices in FIG. 1, which presents a drawing illustrating communication between portable electronic device 110, A/V hub 112, A/V display device 114-1 and one or more content sources 116. In particular, processor 310 may determine display instructions 510 specifying information to be displayed on a display in an A/V display device 114-1. Then, processor 310 may optionally provide, via interface circuit 314, display instructions 510 to A/V display device 114-1 for display on the display.

Moreover, processor 310 may optionally provide, via interface circuit 314, user-interface information 512 to portable electronic device 110. After receiving user-interface information 512, portable electronic device 110 may optionally display an associated user interface on a touch-sensitive display (such as touch-sensitive display 124 in FIG. 1) in portable electronic device 110. However, in other embodiments user-interface information 512 is optionally generated by portable electronic device 110.

Next, portable electronic device 110 may provide user-interface activity information 514 that specifies user selection of one of content sources 116 (such as user activation of a single command feature associated with the one of content sources 116) to A/V hub 112. After receiving user-interface activity information 514, interface circuit 314 may provide user-interface activity information 514 to processor 310. In response, processor 310 may instruct interface circuit 314 to provide request 516 for HDMI content 518 to the one of content sources 116. In addition, processor 310 may optionally determine display instructions 520 based on a format of the display in A/V display device 114-1. Alternatively, display instructions 520 may be predetermined or predefined.

After receiving request 516, the one of content sources 116 may provide HDMI content 518 to A/V hub 112. Furthermore, interface circuit 314 may provide HDMI content 518 and display instructions 520 to A/V display device 114-1 as frames with HDMI content 518 are received from the one of content sources 116, so that HDMI content 518 is displayed on the display in A/V display device 114-1. Note that display instructions 520 may specify that HDMI content 518 is to be displayed in a tiled window on the display while additional HDMI content from another of content sources 116 is displayed on the display. (Alternatively, in some embodiments interface circuit 314 provides HDMI content 518 to processor 310, which instructs interface circuit 314 to provide HDMI content 518 and display instructions 1520 to A/V display device 114-1 as frames with HDMI content 518 are received from the one of content sources 116.)

In response to receiving, via interface circuit 314, user-interface activity information 522 from portable electronic device 110, processor 310 may optionally determine and provide display instructions 524 to A/V display device 114-1 and/or optional command 526 to the one of content sources 116. For example, if user-interface activity information 522 specifies de-activation of the one of content sources 116 based on user activation of the single command feature (or another single command feature) in portable electronic device 110, display instructions 524 may indicate that the tiled window on the display is discontinued. In addition, processor 310 may provide optional command 526 to the one of content sources 116 to discontinue HDMI content 518. Alternatively, user-interface activity information 522 may specify user selection of the tilted window, and display instructions 524 may indicate that HDMI content 518 is displayed in a central tiled window on the display and display of the tiled window on the display is discontinued.

In some embodiments, user-interface activity information 522 specifies user selection of another one of content sources 116 (such as user activation of another single command feature associated with the other one of content sources 116). In these embodiments, optional command 526 requests additional HDMI content from the other one of content sources 116. As the additional HDMI content is received by A/V hub 112, interface circuit 314 may provide the additional HDMI content and display instructions 524 to A/V display device 114-1 as frames with the additional HDMI content are received from the one of content sources 116, so that the additional HDMI content is displayed on the display in A/V display device 114-1. Note that display instructions 524 may specify that the additional HDMI content is to be displayed in another tiled window on the display while HDMI content 518 from the one of content sources 116 is displayed on the display in the tiled window.

In this way, the display technique may make it easier and more intuitive for a user to control the content and the layout of the content displayed on the A/V display device (such as how and where the content is displayed). In the process, the display technique may reduce user frustration, and thus may improve user satisfaction when using the portable electronic device, the A/V hub, the A/V display device and/or the one or more content sources.

Figure 6:
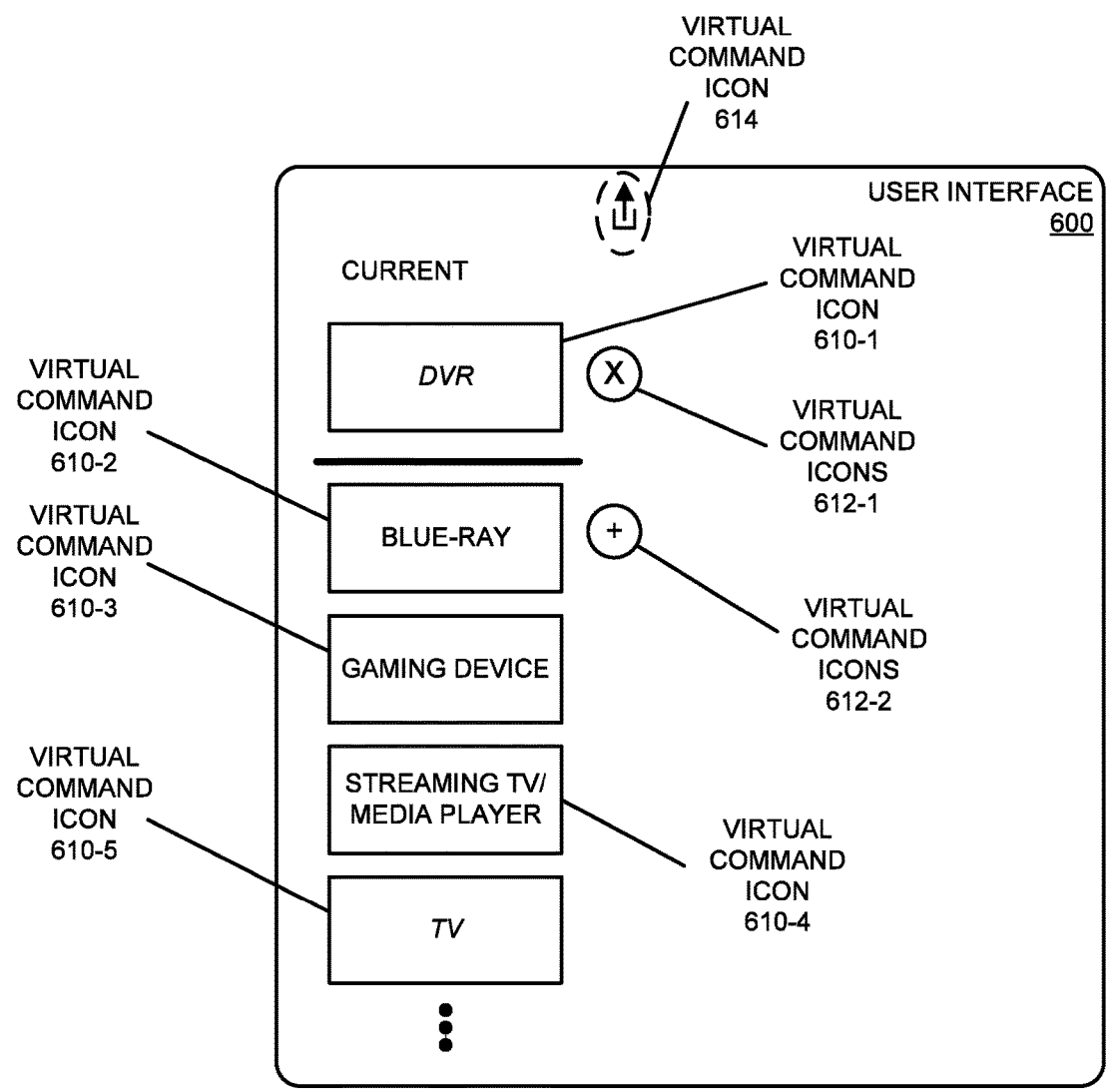
FIG. 6 is a drawing illustrating a user interface in a portable electronic device of FIG. 1 in accordance with an embodiment of the present disclosure.

In an exemplary embodiment, the portable electronic device includes a touch-sensitive display and the user interface includes features (such as virtual command icons) associated with the content sources and the layout of the content displayed on the A/V display device. This user interface is shown in FIG. 6, which presents a drawing illustrating a user interface 600 on a touch-sensitive display 124 in portable electronic device 110 in FIG. 1. In particular, user interface 600 may include one or more virtual command icons 610 that are associated with content sources (such as content sources 116 in FIG. 1). By activating one of virtual command icons 610 (such as by using a finger or digit to touch and then break contact with a surface of the touch-sensitive display within a strike area associated with the virtual command icon), a user may provide user-interface activity information that instructs an A/V hub (such as A/V hub 112 in FIG. 1) to request HDMI content from the one of the content sources (such as the DVR) and, after receiving the HDMI content, to provide it along with display instructions to an A/V display device (such as one of A/V display devices 114 in FIG. 1). As noted previously, the HDMI content may be presented on a display in the A/V display device in a tiled window in real-time (i.e., as frames of the HDMI content are received from the content source). Note that the A/V hub may collect the HDMI content in a buffer until a frame is received, and then the A/V hub may provide the complete frame to the A/V display device. Alternatively, the A/V hub may provide packets with portions of a frame to the A/V display device as they are received.

In some embodiments, if the user makes and maintains contact with the surface of the touch-sensitive display within a strike area associated with one of virtual command icons 610 or if the user activates this virtual command icon, the resulting user-interface activity information from the portable electronic device instructs the A/V hub to provide display instructions for a list of display options to be displayed on the A/V display device. In addition, if the user makes and maintains contact with the surface of the touch-sensitive display within a strike area associated with one of virtual command icons 610 or if the user activates this virtual command icon, an associated one of virtual command icons 612 may be displayed. In particular, user interface 600 may be modified (either by the portable electronic device and/or in response to user-interface information received from the A/V hub) to include one of virtual command icons 612 associated with a display option. For example, the display option may include: discontinuing the display of the HDMI content from the content source (and, thus, to discontinue or close the tiled window), as indicated by the circle with the 'X' for virtual command icon 612-1; and/or, if the one of virtual command icons 612 associated with a new content source (i.e., a content source whose HDMI content is not currently displayed), displaying the HDMI content from the new content source in another tiled window, as indicated by the circles with the '+' for virtual command icon 612-2. In particular, if the user makes and maintains contact with the surface of the touch-sensitive display within a strike area associated with virtual command icon 610-1 or if the user activates this virtual command icon, virtual command icon 612-1 may be displayed. Thus, if the user touches virtual command icon 610-1, the corresponding one of virtual command icons 612 (the circle with the 'X') may be displayed. Then, if the user slides the contact area over virtual command icon 612-1 and releases the contact (thereby providing an activation command), the portable electronic device providing user-interface activation information to the A/V hub that instructs the A/V hub to communicate with the DVR to discontinue the data stream with content (such as HDMI content) from the DVR. Alternatively, if the user makes and maintains contact with the surface of the touch-sensitive display within a strike area associated with virtual command icon 610-2 or if the user activates this virtual command icon, virtual command icon 612-2 may be displayed. Thus, if the user touches virtual command icon 610-2, the corresponding one of virtual command icons 612 (the circle with the '+') may be displayed. Then, if the user slides the contact area over virtual command icon 612-2 and releases the contact (thereby providing an activation command), the portable electronic device providing user-interface activation information to the A/V hub that instructs the A/V hub to communicate with the Blue-Ray player to initiate a data stream with content (such as HDMI content) that will be displayed on the A/V display device (such as in a tiled window). Note, therefore, that virtual command icons 612 may be dynamically displayed in the user interface depending on which virtual command icon 610 is selected, and may depend upon the current state of the associated content source, as well as whether at least one other content source is currently providing a data stream with content (such as HDMI content).

Note that the content sources may be associated with different providers and may be at arbitrary locations in an environment (such as in different rooms in a structure than the A/V hub and the A/V display device). Thus, the display technique may be independent of or insensitive to the actual location of the content source(s) that provide the HDMI content. In these embodiments, if the user makes and maintains contact with the surface of the touch-sensitive display within a strike area associated with one of virtual command icons 610 and/or 612, user interface 600 may be modified (either by the portable electronic device and/or in response to user-interface information received from the A/V hub) to include information specifying the location of an associated content source in the environment (such as in the information displayed in one of virtual command icons 610). However, in other embodiments virtual command icons 610 indicates available content sources to the user without indicating the locations of the content sources. Thus, the display technique may allow the portable electronic device and the A/V hub to operate in a content-source-location independent manner, i.e., the associated HDMI content may be displayed independently of a location of the associated content source.

Similarly, as described further below with reference to FIGS. 18-20, the user may use virtual command icon 614 in user interface 600 to perform one-operation casting of content (such as HDMI content) from one A/V display device in the environment to another A/V display device in the environment. In particular, the user may be able to cast the HDMI content by activating virtual command icon 614. For example, if the user selects a content source that is currently providing a data stream to an A/V display device somewhere in system 100 (FIG. 1) by touching the surface of the touch-sensitive display within a strike area associated with virtual command icons 610, user interface 600 may be modified (either by the portable electronic device and/or in response to user-interface information received from the A/V hub) to include virtual command icon 614. If the data stream with content from the selected content source is currently being displayed on an A/V display device at another location (such as in a different room), then, if the user activates virtual command icon 614, another data stream with this content may be cast and displayed on another A/V display device, such as an A/V display device that the user is controlling using the portable electronic device. This 'one-step casting' (based on the activation of a single command feature, such as a single virtual command icon or physical button) may involve the A/V hub providing one or more commands or instructions in response to receiving information specifying an activation command associated with the activation of virtual command icon 614. In some embodiments, the one or more commands include selectively turning on the other A/V display device (if the other A/V display device is not already activated), instructing the content source to provide the other data stream with the selected content to the A/V hub, etc. Thus, the one-step casting may be performed based on device-state information, such as device-state information about the other A/V display device.

Alternatively, the user selects a content source that is currently providing a data stream to an A/V display device at the user's current location, then user interface 600 may be modified (either by the portable electronic device and/or in response to user-interface information received from the A/V hub) to include information specifying available A/V display devices or information associated with the available A/V display devices (such as locations in the environment of the A/V display devices). Next, if the user activates one of the virtual command icons associated with one of the available A/V display devices (such as a virtual command icon associated with a location, e.g., a television in the living room or a bedroom), the resulting user-interface activity information from the portable electronic device may instruct the A/V hub to provide display instructions to the specified A/V display device and to route or cast the HDMI content from one of the content sources to the specified A/V display device. Once again, this may involve one or more commands or instructions from the A/V hub, and the one or more commands or instructions may be selected intelligently based on device-state information. In this way, the user may simply and intuitively cast content, such as HDMI content, from one A/V display device to another A/V display device.

Figure 4:
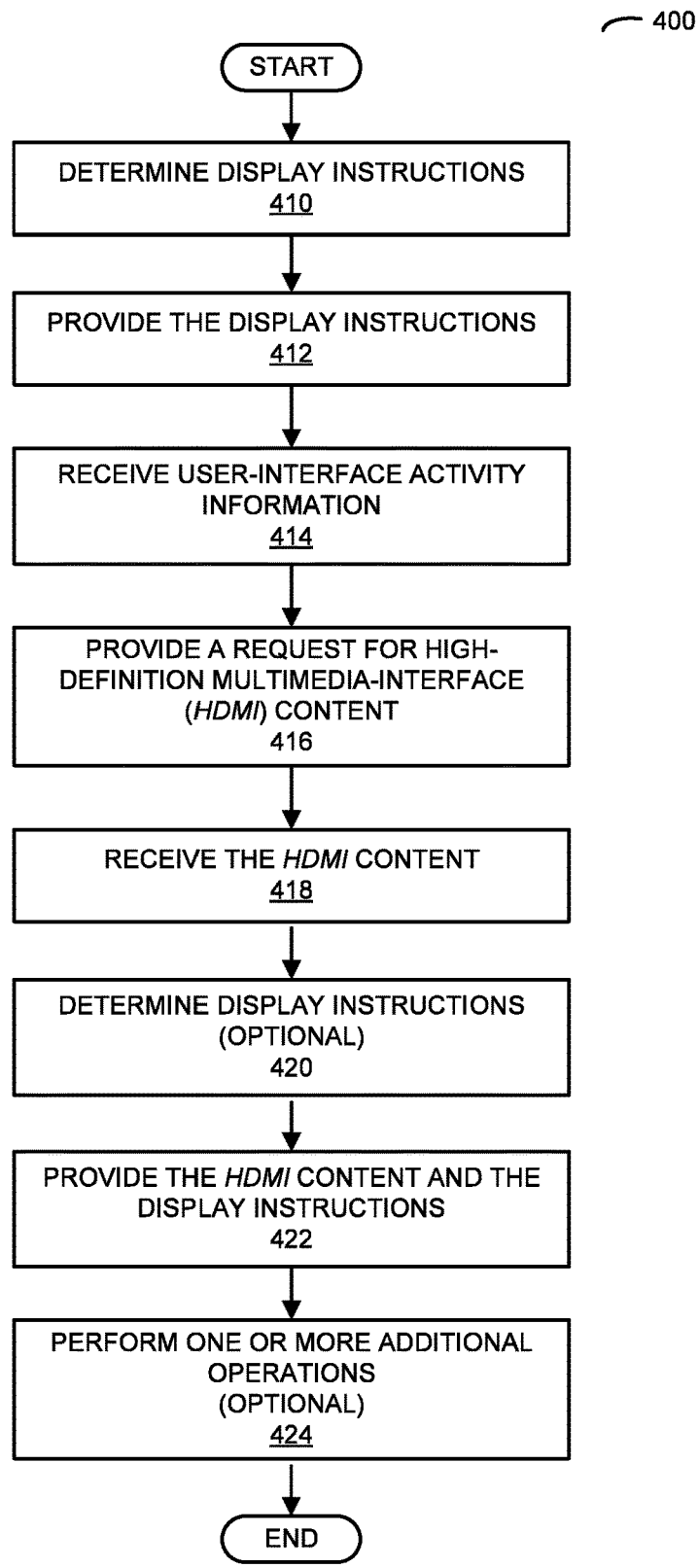
FIG. 4 is a flow diagram illustrating a method for providing HDMI content in accordance with an embodiment of the present disclosure.
Figure 7:
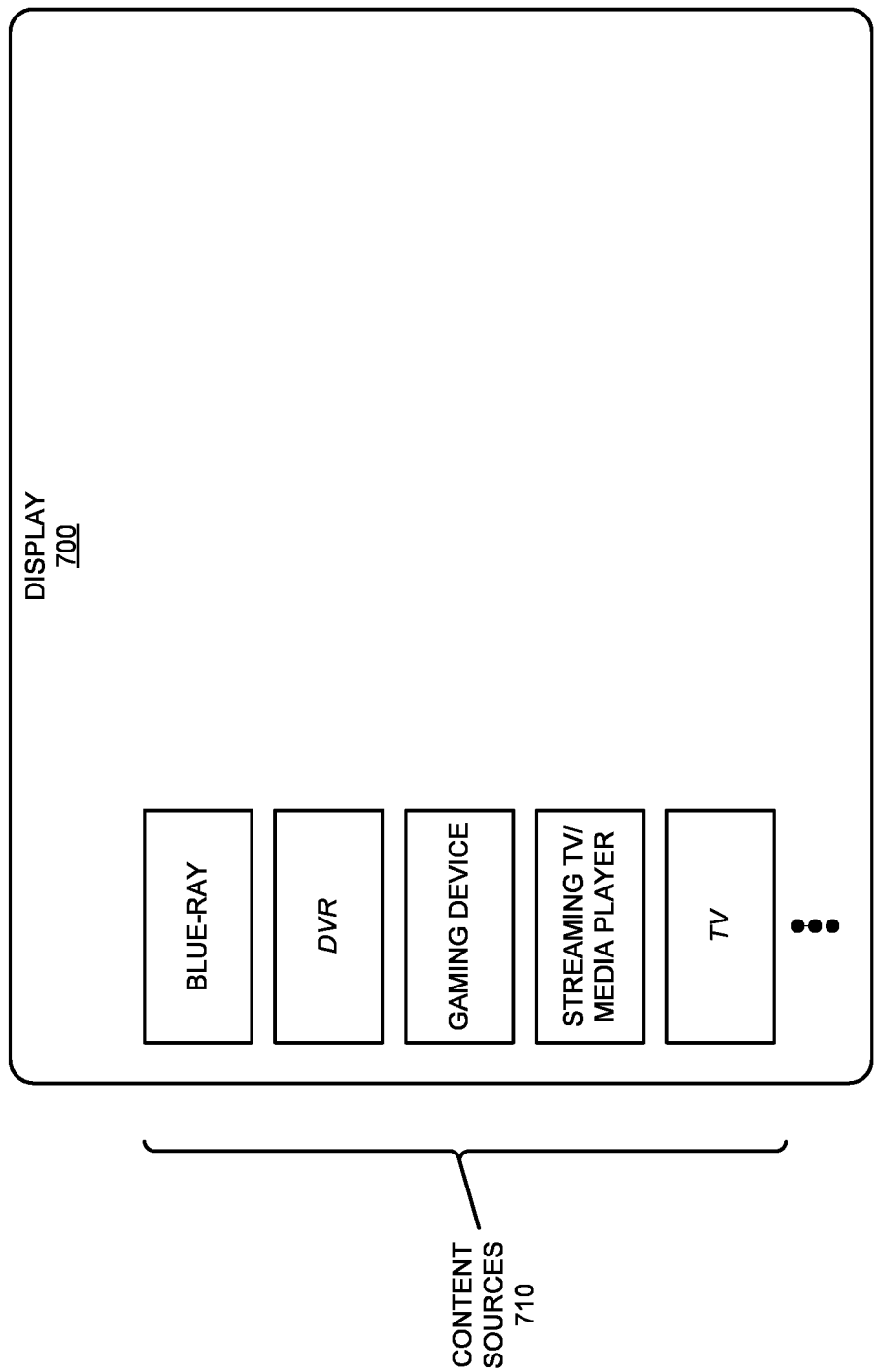
FIG. 7 is a drawing illustrating a display in the audio/video (A/V) display device of FIG. 1 in accordance with an embodiment of the present disclosure.

We now describe embodiments of the information displayed on the A/V display device during methods 200 (FIG. 2) and/or 400 (FIG. 4). FIG. 7 presents a drawing illustrating a display 700 (which is sometimes referred to as a 'command window') in an A/V display device (such as A/V display device 114-1 in FIG. 1). In particular, display 700 shows a list of available content sources 710. However, currently no HDMI content is displayed on display 700.

Figure 8:
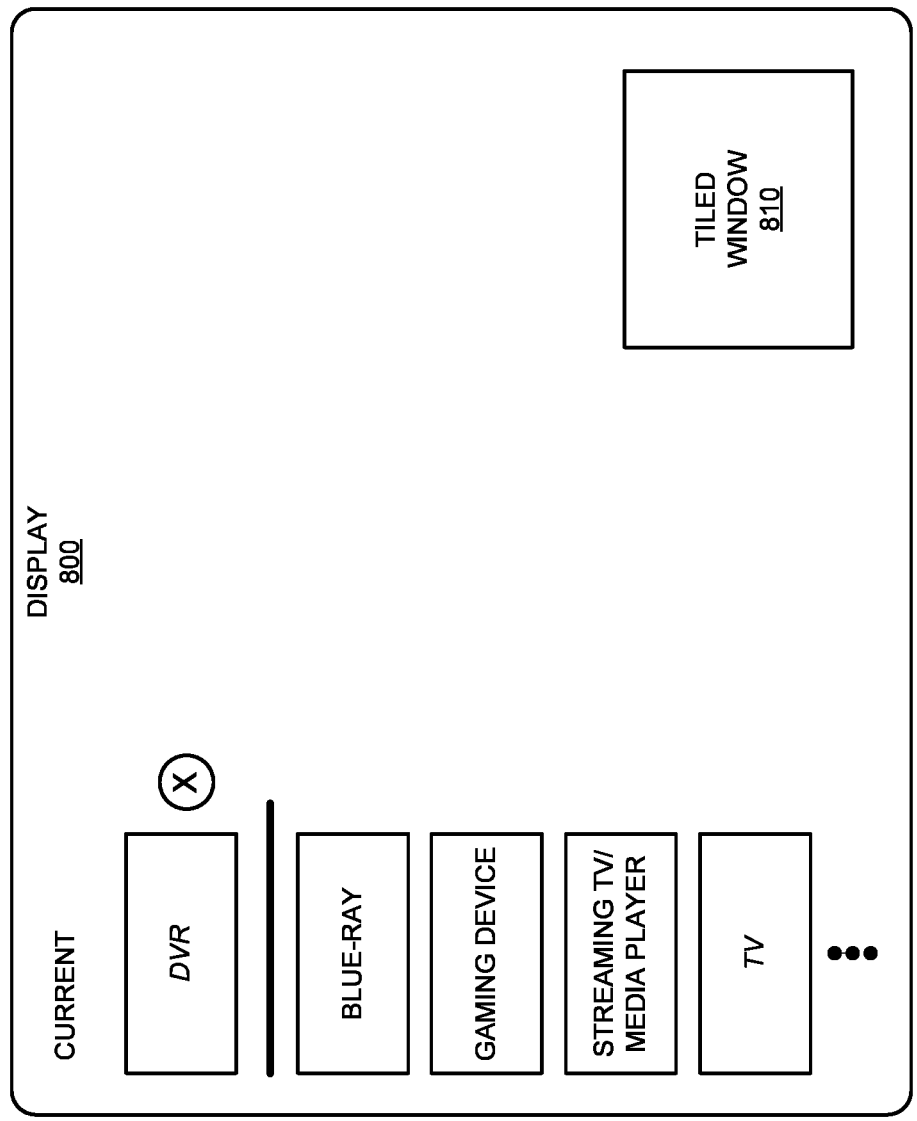
FIG. 8 is a drawing illustrating a display in the A/V display device of FIG. 1 in accordance with an embodiment of the present disclosure.

When the user activates one of the virtual command icons associated with one of content sources 710 (such as DVR), the A/V hub may provide display instructions and, after requesting and receiving HDMI content from the one of content sources 710, may provide the HDMI content to A/V display device. As shown in FIG. 8, which presents a drawing illustrating a display 800 in the A/V display device, the HDMI content may be presented in a tiled window 810. Note that the list of available content sources highlights the DVR under 'current and that the remaining content sources are shown below the horizontal line in alphabetical order. Thus, the user may use the user interface on the portable electronic device to dynamic select and set up a tiling window using one step or operation. (However, in other embodiments, more than one step or operation may be used.) Note that if the virtual command icon for the DVR is still selected, the user may be presented with an 'X' virtual command icon that the user can use to discontinue the display of the HDMI content in tiled window 810. Thus, one or more of virtual command icons 612 (FIG. 6) may be dynamically displayed on display 810 based on the user's selections and/or activation of virtual command icons concurrently displayed on the user interface in the portable electronic device.

Figure 9:
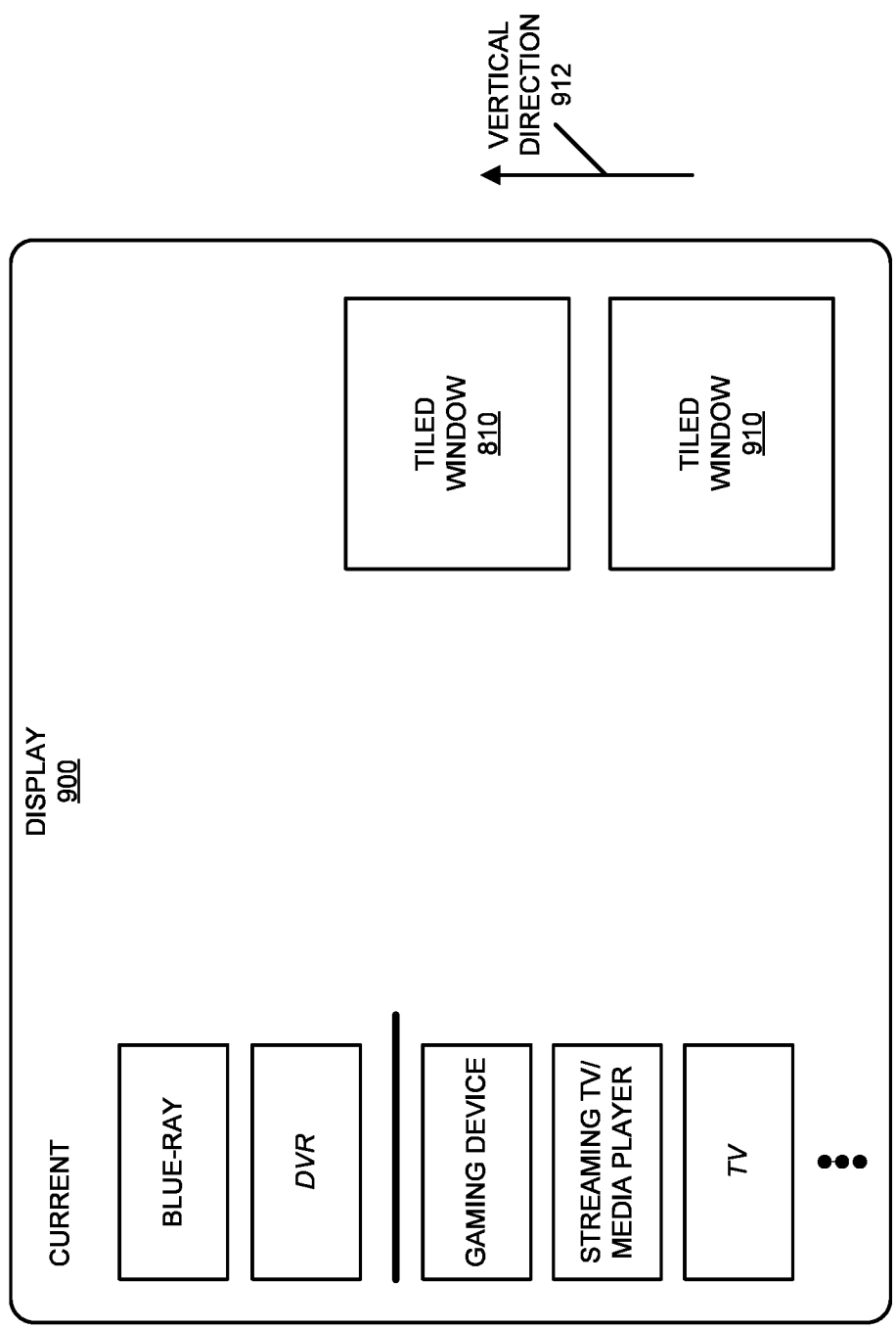
FIG. 9 is a drawing illustrating a display in the A/V display device of FIG. 1 in accordance with an embodiment of the present disclosure.

Similarly, when the user selects another of the virtual command icons associated with a second one of the content sources (such as a Blue-Ray player) and then activates a '+' virtual command icon that is dynamically displayed next to the selected other virtual command icon, the A/V hub may provide display instructions and, after requesting and receiving additional HDMI content from the second content source, may provide the additional HDMI content to A/V display device. As shown in FIG. 9, which presents a drawing illustrating a display 900 in the A/V display device, the additional HDMI content may be presented in a tiled window 910. Note that the additional HDMI content may be presented in a tiled window 910 may be presented on display 900 concurrently or simultaneously with the HDMI content presented in tiled window 810. Thus, there may be multiple independent real-time or live video streams presented or displayed in display 900. The user may user the user interface on the portable electronic device to select the audio for one of tiled windows 810 and 910, which is then output on the portable electronic device (such as to headphones), while the audio from the other of tiled windows 810 and 910 may be output on speakers in the same room or another room in the environment that includes the A/V hub.

Figure 10:
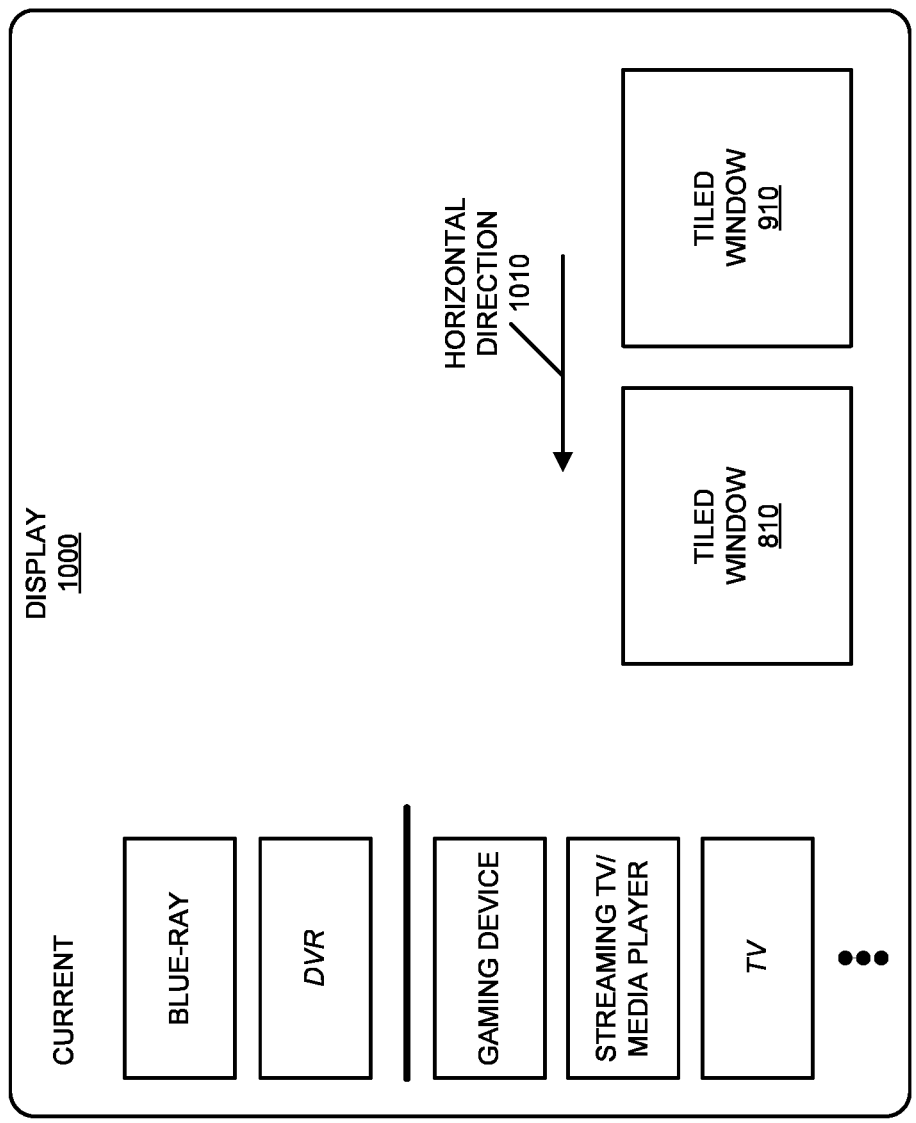
FIG. 10 is a drawing illustrating a display in the A/V display device of FIG. 1 in accordance with an embodiment of the present disclosure.

While FIG. 9 illustrates tiled windows 810 and 910 arranged along a vertical direction 912, in other embodiments different spatial arrangements or configurations of tiled windows 810 and 910 are used. This is illustrated in FIG. 10, which presents a drawing illustrating a display 1000 in the A/V display device in which tiled windows 810 and 910 are arranged along a horizontal direction 1010.

Figure 11:
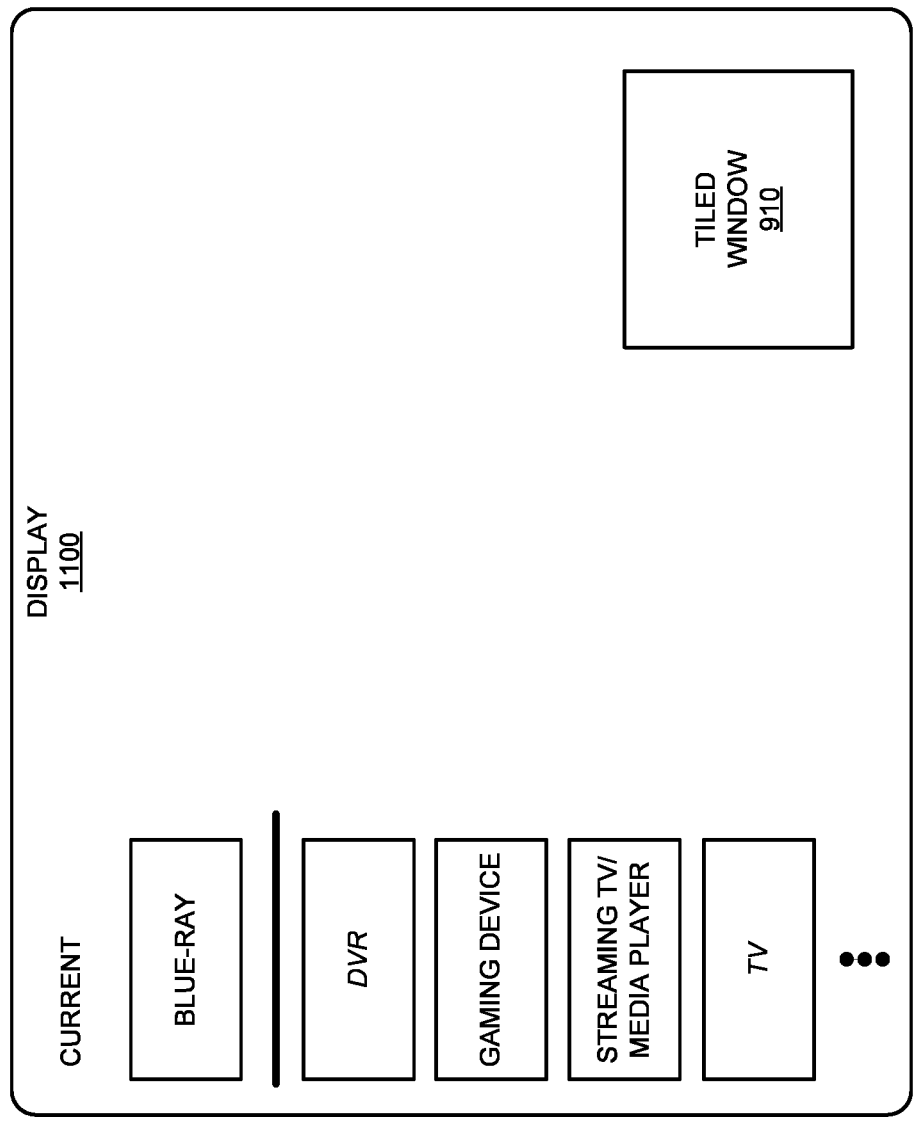
FIG. 11 is a drawing illustrating a display in the A/V display device of FIG. 1 in accordance with an embodiment of the present disclosure.

Furthermore, as discussed previously, the user may use the user interface on the portable electronic device to discontinue the display of HDMI content from one of the content sources. For example, after tiled window 810 is displayed, if the user holders their finger in contact with the surface of the touch-sensitive display on the portable electronic device within the strike area of a virtual command icon associated with the DVR, the user interface on the portable electronic device and the information to be displayed on the display in the A/V display device may be modified to indicate that the user has the option to discontinue the display of HDMI content from the one of the content sources (such as the DVR). In particular, a virtual command icon represented by an 'X' in a circle may be displayed adjacent to the virtual command icon for the DVR. If the user activates this virtual command icon, the A/V hub may provide display instructions to the A/V display device to discontinue tiled widow 810 and may instruct the DVR to discontinue providing the HDMI content. As shown in FIG. 11, which presents a drawing illustrating a display 1100 in the A/V display device, tiled window 810 may be discontinued, so that only tiled window 910 with the additional HDMI content is displayed.

Figure 12:
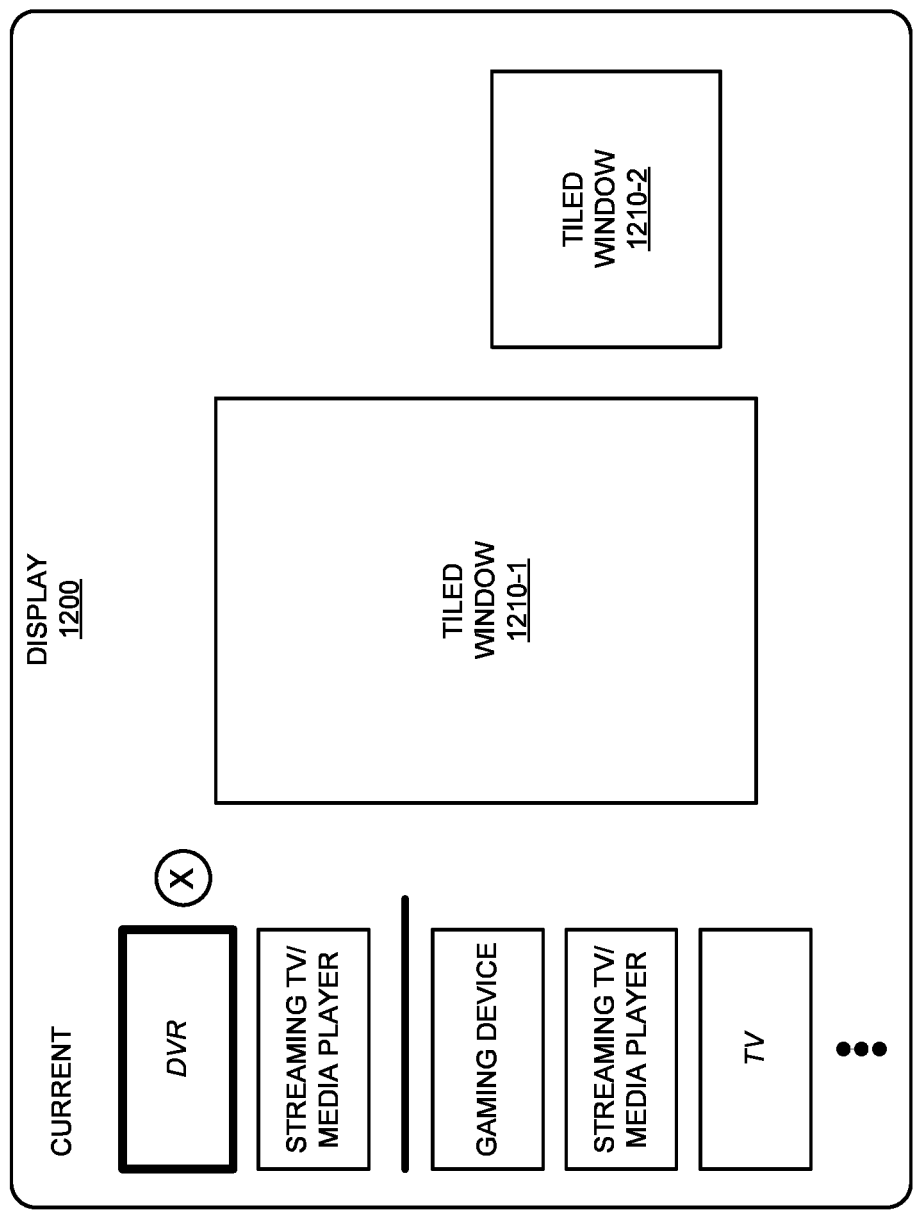
FIG. 12 is a drawing illustrating a display in the A/V display device of FIG. 1 in accordance with an embodiment of the present disclosure.

In some embodiments, the user may use the user interface on the portable electronic device to move the HDMI content displayed in a tiled window to a central tiled window in the display in the A/V display device. This is illustrated in FIG. 12, which presents a drawing illustrating a display 1200 in the A/V display device. As shown in FIG. 12, initially there may be one or more tiled windows 1210 that display HDMI content associated with one or more of the content sources that are currently providing data streams with HDMI content, such as the DVR and the streaming TV/media player. Initially, tiled window 1210-1 may display the HDMI content from the DVR, and tiled window 1210-2 may display the HDMI content from the streaming TV/media player. Note that when the user contacts the surface of the touch-sensitive display within a strike area of the virtual command icon for the DVR and/or activates this virtual command icon, an additional virtual command icon (as represented by the circle with the 'X') that allows the user to discontinue the displaying of tiled window 1210-1 is dynamically displayed.

Figure 13:
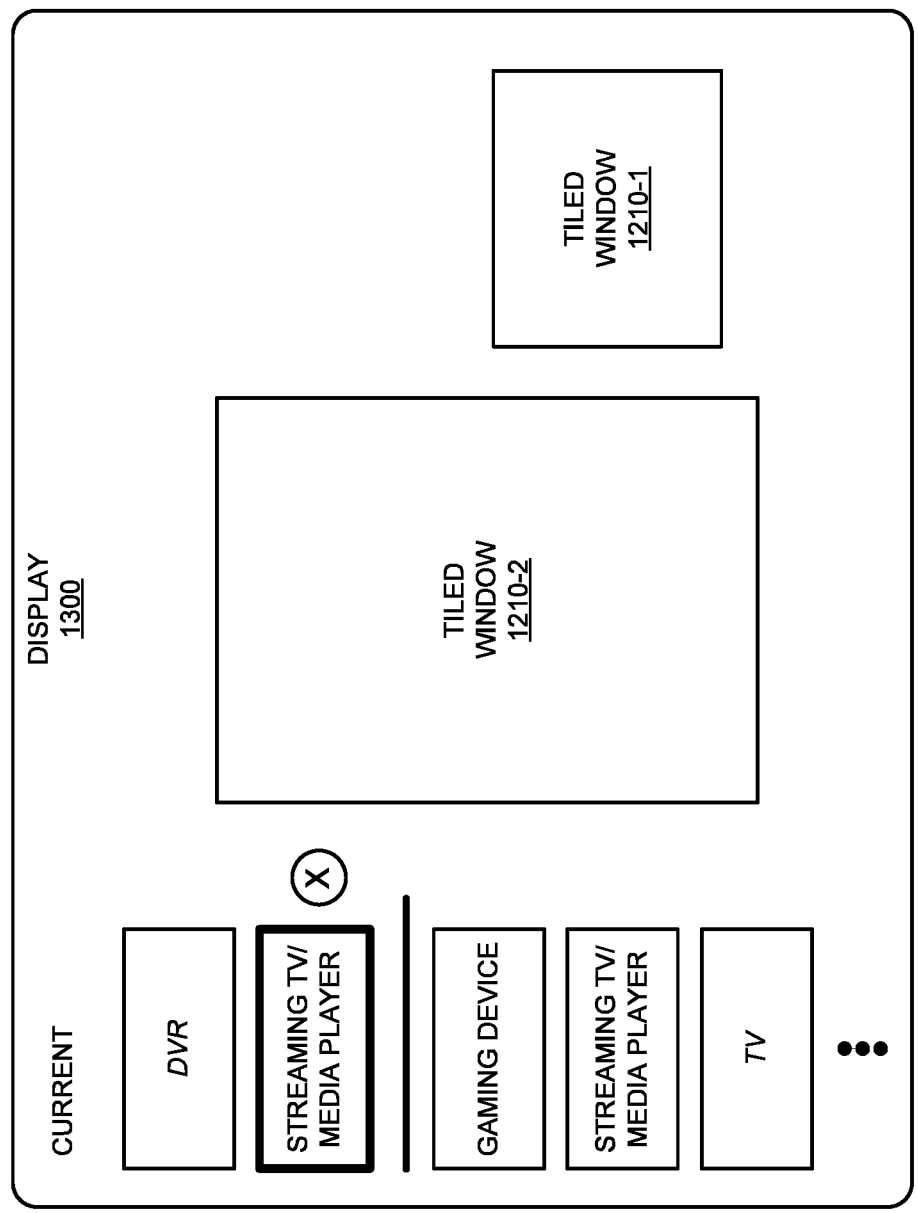
FIG. 13 is a drawing illustrating a display in the A/V display device of FIG. 1 in accordance with an embodiment of the present disclosure.

Then, if the user slides over and activates the virtual command icon for the streaming TV/media player (by contacting and releasing the surface of the touch-sensitive display within an associated strike area) the positions of tiled windows 1210 may be reversed. (Note that an additional virtual command icon that allows the user to discontinue the displaying of tiled window 1210-2 is also dynamically displayed.) In particular, in response to activating the virtual command icon for the streaming TV/media player, the A/V hub may provide display instructions that transitions the associated HDMI content to a central tiled window and discontinues the initial tiled window. The result is shown in FIG. 13, which presents a drawing illustrating a display 1300 with the HDMI content presented or displayed in central tiled window 1210-2. Thus, the user may use the user interface on the portable electronic device to dynamically change the HDMI content displayed in the central tiled window.

While the preceding discussion illustrated the use of a virtual command icons in a user interface displayed on a touch-sensitive display in the portable electronic device, in other embodiments the user may activate physical buttons. For example, the user may point the portable electronic device at a location on the A/V display device and may press a button. The location on the A/V display device, which may correspond to a virtual command icon, may be identified based on an infra-red signal from the portable display device, wireless ranging and/or orientation of the portable display device, etc. This user-interface information may be used by the A/V hub to perform one or more commands or instructions and, as needed, to modify the displayed user interface on the A/V display device.

In some embodiments, tiled windows with video content are displayed without the user activating an associated virtual command icon or a physical button. For example, the display of a tiled window may be event driven, such as when a security or intrusion-detection device is trigger (such as based on sound or motion detection) or when a baby monitor detects motion or a baby crying. In these cases, a tiled window with video from a security camera or a baby camera may be automatically displayed based on the context. This may allow the user to visually assess whether further action is required.

Figure 14:
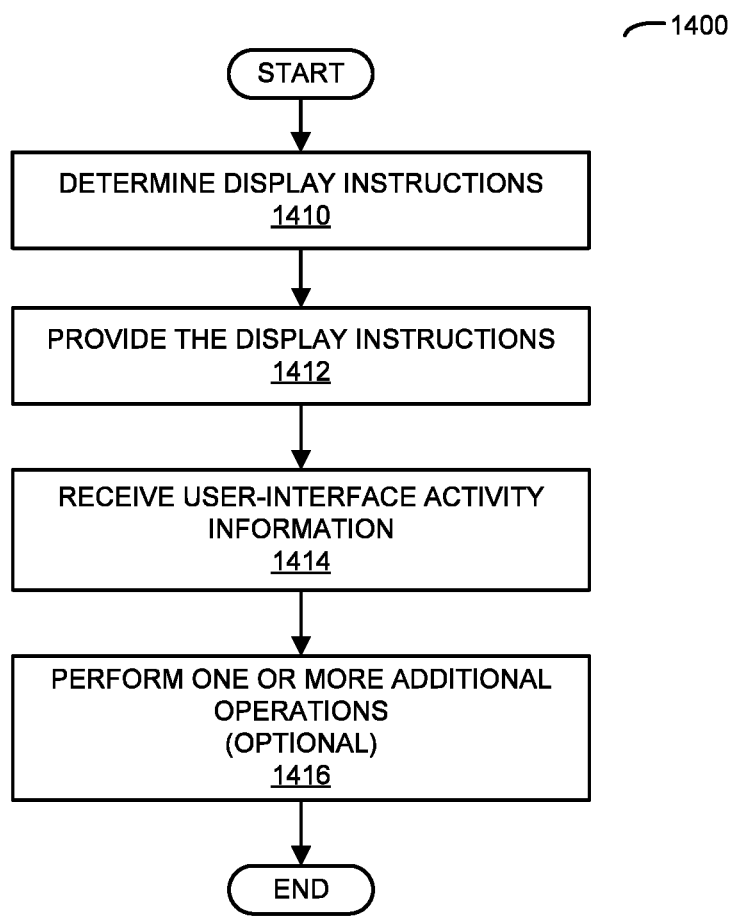
FIG. 14 is a flow diagram illustrating a method for providing display instructions in accordance with an embodiment of the present disclosure.

Embodiments of the display technique are further illustrated in FIG. 14, which presents a flow diagram illustrating a method 1400 for providing display instructions. This method may be performed by an A/V hub, such as A/V hub 112 (FIG. 1). During operation, the A/V hub (such as a control circuit or control logic, e.g., a processor executing a program module and/or or a circuit) generates display instructions (operation 1410) specifying information to be displayed on a display in an A/V display device, where the information to be displayed includes icons associated with the content sources. Note that the content sources may be located at arbitrary locations in a structure, including locations external to an environment of the A/V hub and the A/V display device. For example, the environment may include one or more rooms in the structure, and the arbitrary locations may be located in different rooms in the structure than the A/V hub and the A/V display device.

Then, the A/V hub provides, via an interface circuit in the A/V hub, the display instructions (operation 1412) to the A/V display device for display on the display.

Next, the A/V hub may optionally receive, via the interface circuit, user-interface activity information (operation 1414) from a portable electronic device that specifies user selection of a content source. For example, the user-interface activity information may include activation of a virtual command icon displayed in the user interface on a touch-sensitive display in the portable electronic device. Alternatively, the user-interface activity information may include activation or changing a state or configuration of a physical button. Note that the A/V hub may optionally: generate user-interface information that specifies the user interface that includes one or more virtual command icons, including the virtual command icon, which are associated with the content sources; and provides the user-interface information to the portable electronic device for display on the touch-sensitive display in the portable electronic device. However, in other embodiments the user-interface information is optionally generated by the portable electronic device.

In response, the A/V hub may optionally perform one or more additional operations (operation 1416). In particular, the A/V hub may optionally: provide, via the interface circuit, a request for HDMI content to the content source; selectively provide, via the interface circuit, an activation command to the content source based on device-state information of the content source (such as when the content source is not already turned on or activated); receive, via the interface circuit, the HDMI content from the content source; and provide, the HDMI content and second display instructions to the A/V display device as frames with the HDMI content are received from the content source, so that the HDMI content is displayed on the display in the A/V display device. In some embodiments, the A/V hub may optionally determine the second display instructions based on a format of the display. Note that providing the HDMI content and the second display instructions involves transcoding the HDMI content based on the format of the display.

Figure 15:
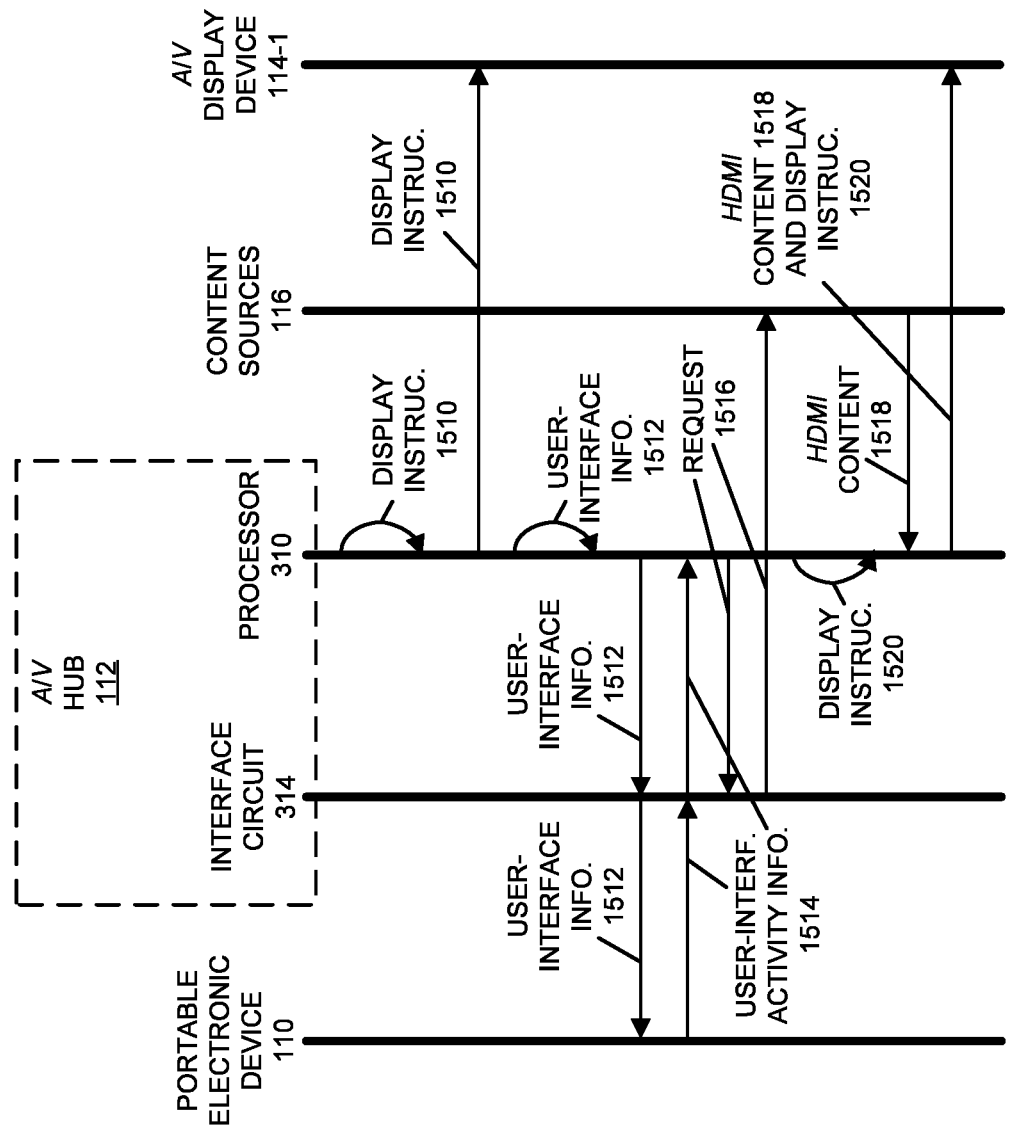
FIG. 15 is a drawing illustrating communication among the electronic devices in FIG. 1 in accordance with an embodiment of the present disclosure.

FIG. 15 presents a drawing illustrating communication among the electronic devices in FIG. 1, which presents a drawing illustrating communication between portable electronic device 110, A/V hub 112, A/V display device 114-1 and one or more content sources 116. In particular, processor 310 may determine display instructions 1510 specifying information to be displayed on a display in an A/V display device 114-1. Then, processor 310 may optionally provide, via interface circuit 314, display instructions 1510 to A/V display device 114-1 for display on the display, where the information to be displayed includes icons associated with content sources 116. Note that content sources 116 may be located at arbitrary locations in a structure, including locations external to an environment of A/V hub 112 and A/V display device 114-1.

Moreover, processor 310 may optionally provide, via interface circuit 314, user-interface information 1512 to portable electronic device 110. After receiving user-interface information 1512, portable electronic device 110 may optionally display an associated user interface on a touch-sensitive display (such as touch-sensitive display 124 in FIG. 1) in portable electronic device 110. However, in other embodiments user-interface information 1512 is optionally generated by portable electronic device 110.

Next, portable electronic device 110 may provide user-interface activity information 1514 that specifies user selection of one of content sources 116 (such as user activation of a single command feature associated with the one of content sources 116) to A/V hub 112. After receiving user-interface activity information 1514, interface circuit 314 may provide user-interface activity information 1514 to processor 310. In response, processor 310 may instruct interface circuit 314 to provide request 1516 for HDMI content 1518 to the one of content sources 116. In addition, processor 310 may optionally determine display instructions 1520 based on a format of the display in A/V display device 114-1. Alternatively, display instructions 1520 may be predetermined or predefined.

After receiving request 1516, the one of content sources 116 may provide HDMI content 1518 to A/V hub 112. Furthermore, interface circuit 314 may provide HDMI content 1518 and display instructions 1520 to A/V display device 114-1 as frames with HDMI content 1518 are received from the one of content sources 116, so that HDMI content 1518 is displayed on the display in A/V display device 114-1. Note that display instructions 1520 may specify that HDMI content 1518 is to be displayed in a tiled window on the display while additional HDMI content from another of content sources 116 is displayed on the display. (Alternatively, in some embodiments interface circuit 314 provides HDMI content 1518 to processor 310, which instructs interface circuit 314 to provide HDMI content 1518 and display instructions 1520 to A/V display device 114-1 as frames with HDMI content 1518 are received from the one of content sources 116.)

In this way, the display technique may make it easier and more intuitive for a user to control the content and the layout of the content displayed on the A/V display device (such as how and where the content is displayed). In particular, by allowing the user to see content sources in a network throughout the environment that includes the A/V hub regardless of their locations and/or the current state of the content sources (which may also be displayed), the display technique may allow the user to select content sources at different locations in the environment and, thus, may provide location-independent operation. In the process, the display technique may reduce user frustration, and thus may improve user satisfaction when using the portable electronic device, the A/V hub, the A/V display device and/or the one or more content sources.

Figure 16:
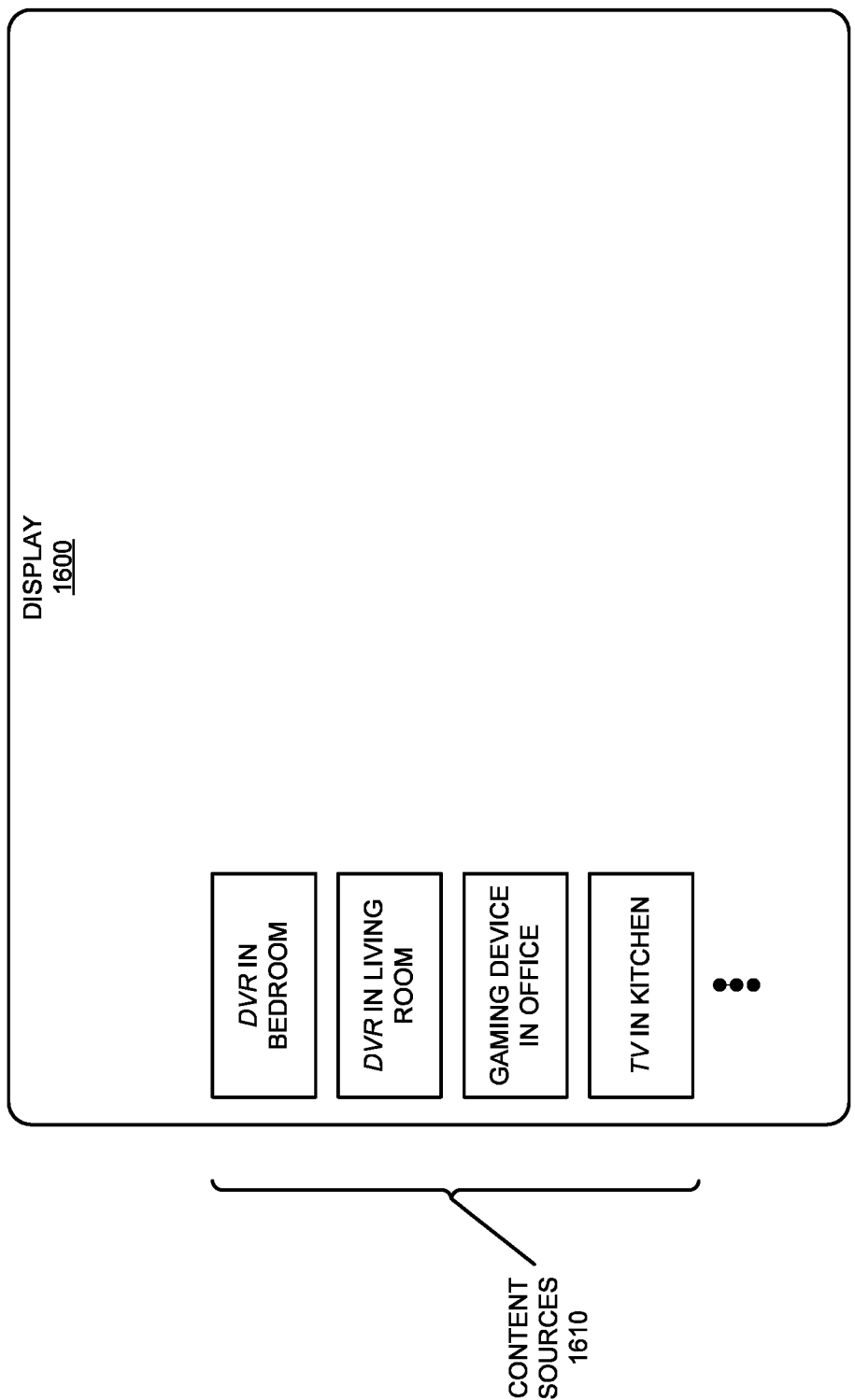
FIG. 16 is a drawing illustrating a display in the A/V display device of FIG. 1 in accordance with an embodiment of the present disclosure.

We now describe embodiments of the information displayed on the A/V display device (in conjunction with one or more virtual command icons in the user interface on the portable electronic device) during method 1400 (FIG. 14). FIG. 16 presents a drawing illustrating a display 1600 in an A/V display device (such as A/V display device 114-1 in FIG. 1). In particular, display 1600 shows a list of available content sources 1610 at different locations in the environment.

Figure 17:
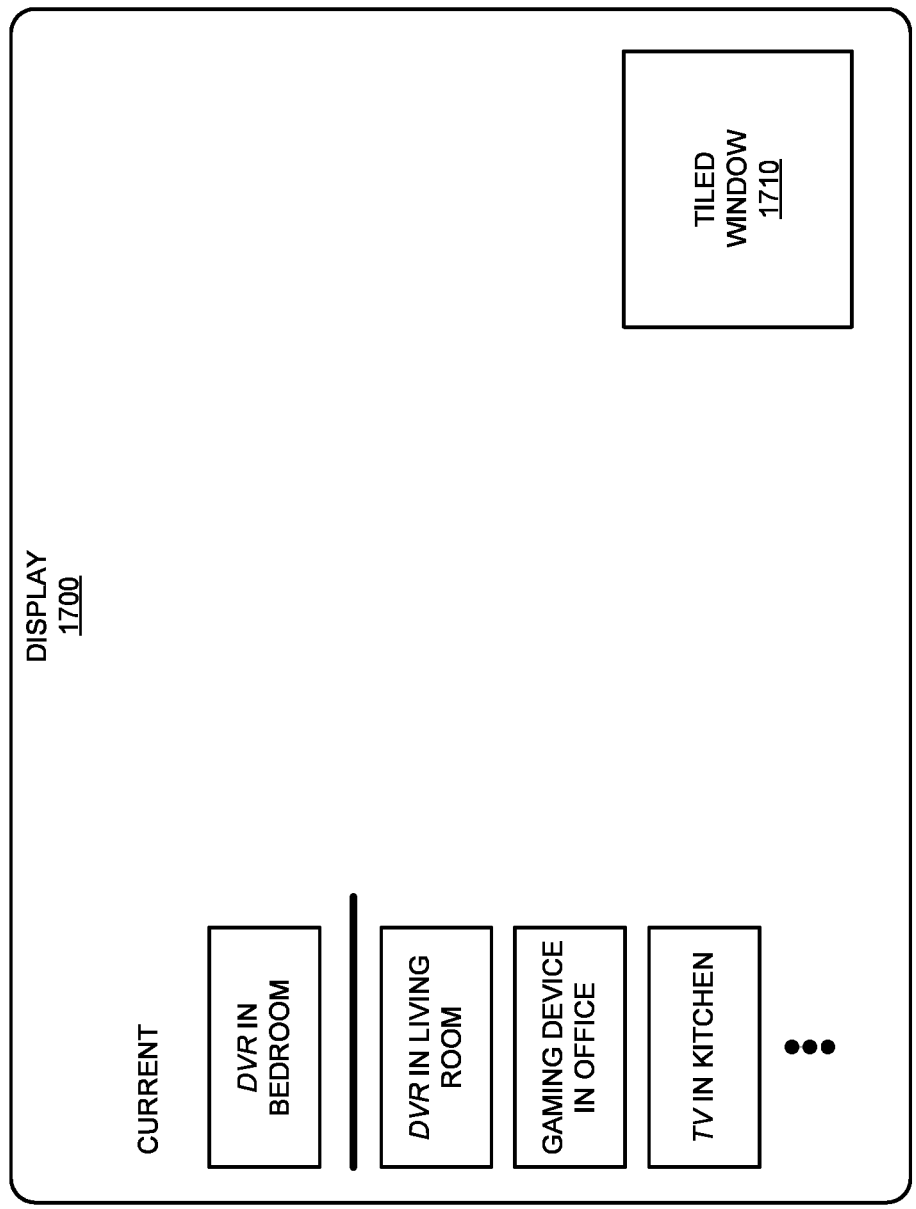
FIG. 17 is a drawing illustrating a display in the A/V display device of FIG. 1 in accordance with an embodiment of the present disclosure.

When the user activates one of the virtual command icons associated with one of content sources 1610 (such as the DVR in the bedroom), the A/V hub may provide display instructions and, after requesting and receiving HDMI content from the one of content sources 1610, may provide the HDMI content to A/V display device. As shown in FIG. 17, which presents a drawing illustrating a display 1700 in the A/V display device, the HDMI content may be presented in a tiled window 1710.

Figure 18:
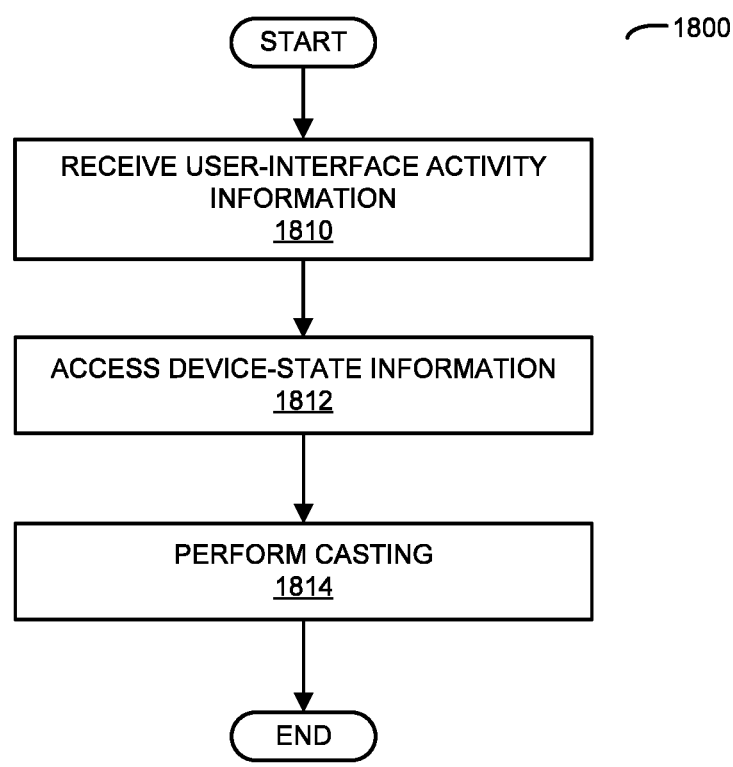
FIG. 18 is a flow diagram illustrating a method for casting of HDMI content in accordance with an embodiment of the present disclosure.

Embodiments of the display technique are further illustrated in FIG. 18, which presents a flow diagram illustrating a method 1800 for casting of HDMI content. This method may be performed by an A/V hub, such as A/V hub 112 (FIG. 1). During operation, the A/V hub (such as a control circuit or control logic, e.g., a processor executing a program module and/or or a circuit) receives, via an interface circuit in the A/V hub, user-interface activity information (operation 1810) from a portable electronic device, where the user-interface activity information specifies a user instruction to cast the HDMI content associated with a content source from a first A/V display device to a second A/V display device (such as from a computer to a television). For example, the user-interface activity information may include activation of one or more virtual command icons (such as a single virtual command icon) displayed in the user interface on a touch-sensitive display in the portable electronic device. Alternatively, the user-interface activity information may include activation or changing a state or configuration of one or more physical buttons (such as a single physical button). Note that the A/V hub may optionally: generate user-interface information that specifies the user interface that includes one or more virtual command icons, including the single virtual command icon, which are associated with the first A/V display device and the second A/V display device; and provides the user-interface information to the portable electronic device for display on the touch-sensitive display in the portable electronic device. However, in other embodiments the user-interface information is optionally generated by the portable electronic device. Note that the first A/V display device and the second A/V display device may be associated with different providers.

In response, the A/V hub accesses device-state information (operation 1812) that specifies a current state of the second A/V display device. For example, as described further below with reference to FIGS. 22 and 23, the device-state information may be determined using a state-detection circuit that is coupled to at least a pin in a port in the A/V hub. Alternatively or additionally, the device-state information may be inferred based on device commands previously provided to the second A/V display device and a device-state diagram. In some embodiments, the device-state information includes a history of one or more most-recent device commands previously provided to and received by the second A/V display device (and, more generally, an entertainment device) and/or a current state of the entertainment device based on the history of the one or more most-recent device commands and a device-state diagram of the second A/V display device (and, more generally, the entertainment device). In some embodiments, the device-state information is stored in a computer-readable medium, such as a memory.

Then, the A/V hub performs the casting (operation 1814) of the HDMI content from the first A/V display device to the second A/V display device using a dynamic number of operations based on the device-state information, so that the HDMI content is displayed on a display in the second A/V display device (which may be provided by a different manufacturer than the first A/V display device). Note that, from the user perspective, the casting operation is from the first A/V display device to the second A/V display device. However, in practice, the casting operation involves the content source providing the HDMI content to the second A/V display device. After the casting operation, the HDMI content may or may not still be displayed on the first A/V display device.

In general, casting may include operations such as: turn on or power on the A/V hub; turn on or power on the second A/V display device; set to correct input or content source; and/or enable casting. Once the user instruction is received, the casting may occur in an automated manner. Note that when the device-state information indicates that the second A/V display device is already powered on, a power-on operation may be excluded from the dynamic number of operations. Moreover, when the device-state information indicates that the second A/V display device is already set to receive the HDMI content from the content source, an operation to set the second A/V display device to receive the HDMI content from the content source may be excluded from the dynamic number of operations. In some embodiments, the casting may include receiving the HDMI content from the content source, transcoding the HDMI content based on a format of a display in the second A/V display device, and providing the transcoded HDMI content to the second A/V display device.

Note that the casting may be performed without further user action after activating the single virtual command icon or the single physical button. (Thus, method 1800 may be used by the user to perform so-called one-step or one-operation casting, even though it may involve the A/V hub performing multiple commands or instructions.)

Figure 19:
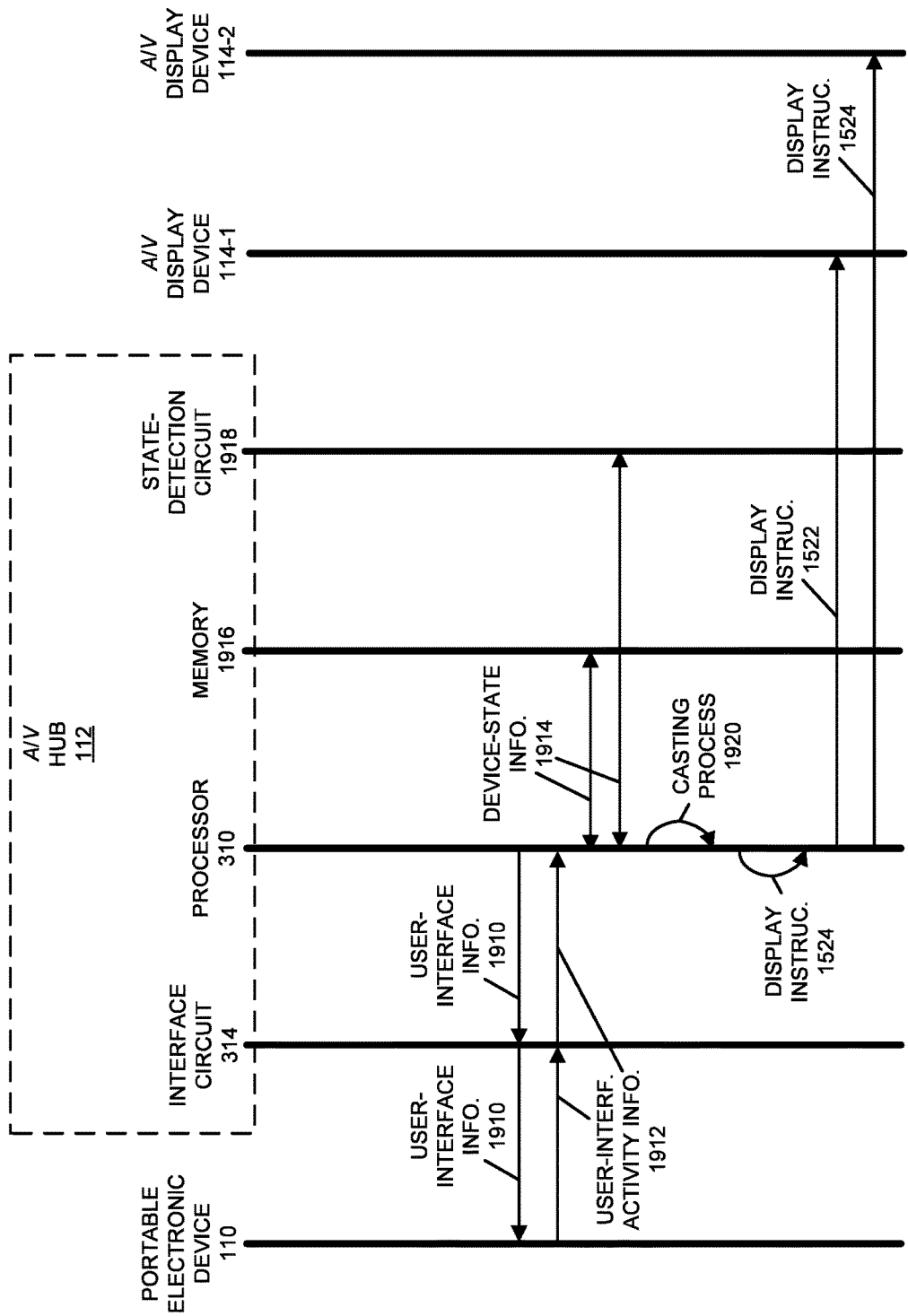
FIG. 19 is a drawing illustrating communication among the electronic devices in FIG. 1 in accordance with an embodiment of the present disclosure.
Figure 20:
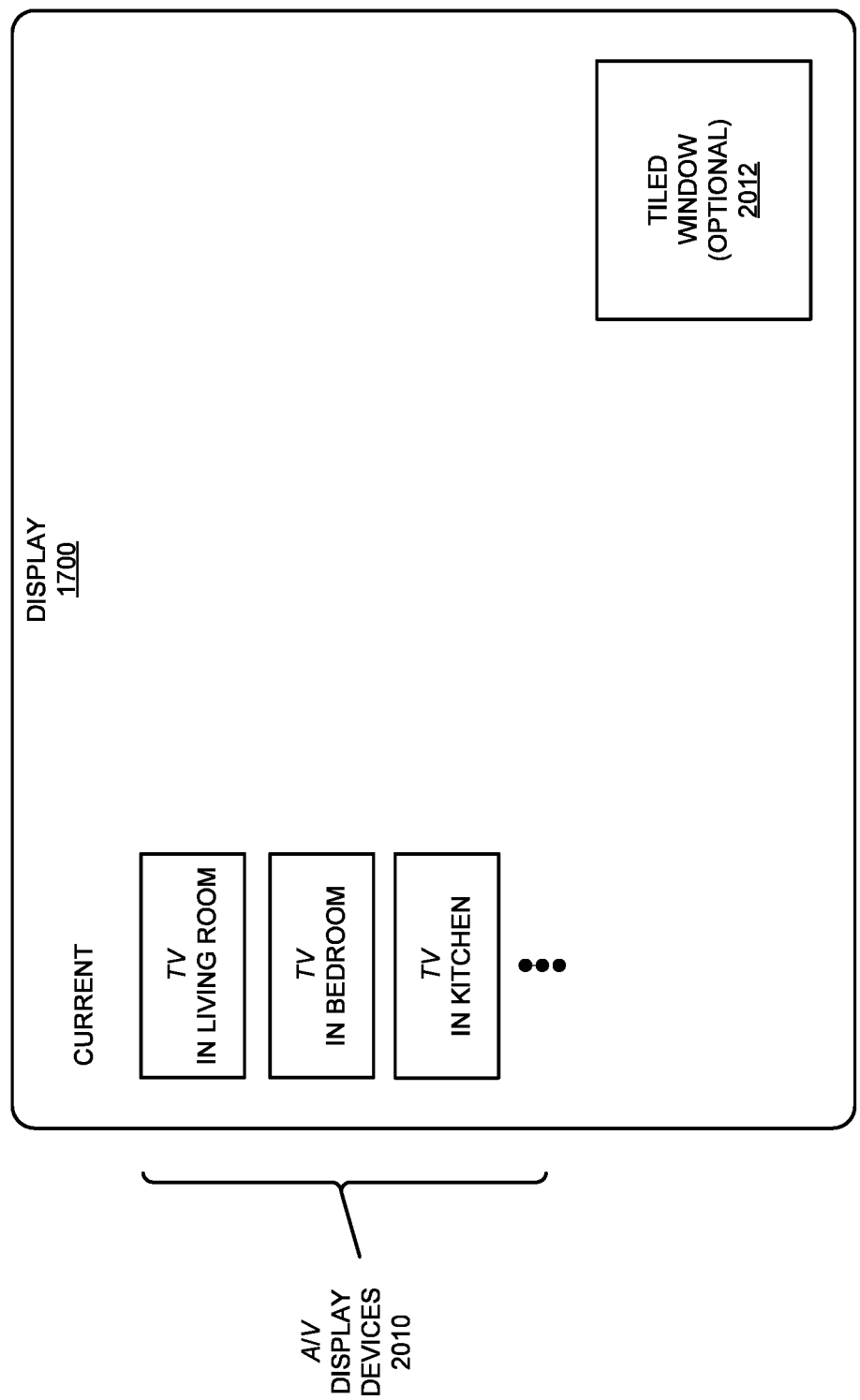
FIG. 20 is a drawing illustrating a display in the A/V display device of FIG. 1 in accordance with an embodiment of the present disclosure.

FIG. 19 presents a drawing illustrating communication among the electronic devices in FIG. 1, which presents a drawing illustrating communication between portable electronic device 110, A/V hub 112, A/V display devices 114-1 and A/V display devices 114-2. In particular, processor 310 may optionally provide, via interface circuit 314, user-interface information 1910 to portable electronic device 110. After receiving user-interface information 1910, portable electronic device 110 may optionally display an associated user interface on a touch-sensitive display (such as touch-sensitive display 124 in FIG. 1) in portable electronic device 110. However, in other embodiments user-interface information 1910 is optionally generated by portable electronic device 110.

Next, portable electronic device 110 may provide to A/V hub 112 user-interface activity information 1912 (such as user activation of a single virtual command icon) that specifies a user instruction to cast the HDMI content associated with a content source from A/V display device 114-1 to A/V display device 114-2. After receiving user-interface activity information 1912, interface circuit 314 may provide user-interface activity information 1912 to processor 310.

In response, processor 310 may access device-state information 1914 of A/V display device 114-2 in memory 1916 and/or may measure or determine device-state information 1914 using state-detection circuit 1918, a device-state diagram and/or a history of previous device commands provided to and/or received by A/V display device 114-2. Based on device-state information 1914, processor 310 may dynamically adapt or change a number of operations in a casting process 1920 based on device-state information 1914. Next, processor 310 may provide, via interface circuit 314, display instructions 1922 to A/V display devices 114-1 and display instructions 1924 to A/V display devices 114-2 to perform casting process 1920. Note that processor 310 may optionally determine display instructions 1924 based on a format of the display in A/V display devices 114-2. Alternatively, display instructions 1924 may be predetermined or predefined.

In this way, the display technique may make it easier and more intuitive for a user to control the content and the layout of the content displayed on the A/V display device (such as how and where the content is displayed). In particular, the display technique may allow the user, with minimum effort or operations, to cast content (such as HDMI content) from one A/V display device to another A/V display device. In the process, the display technique may reduce user frustration, and thus may improve user satisfaction when using the portable electronic device, the A/V hub, and/or one or more A/V display devices.

Consequently, methods 200 (FIG. 2), 400 (FIG. 4), 1400 (FIG. 14) and/or 1800 (FIG. 18) may reduce user errors or mistakes when using the user interface, which may improve the user experience when using the portable electronic device and/or the A/V hub.

In some embodiments of methods 200 (FIG. 2), 400 (FIG. 4), 1400 (FIG. 14) and/or 1800 (FIG. 18), there may be additional or fewer operations. Moreover, the order of the operations may be changed, and/or two or more operations may be combined into a single operation. Furthermore, one or more operations may be modified. For example, instead of involving the activation of a single feature (such as a single virtual command icons), in some embodiments one or more of the operations involve the activation of one or more features (such as one or more virtual command icons). Alternatively or additionally, display instructions may be provided to an A/V display device differentially (such as when the display instructions change), regularly or periodically (such as in one of every N packets or in a packet in each frame) or in each packet.

Note that in this display technique the A/V hub may display the HDMI content (and, more generally, video content) to an arbitrary A/V display device (including an A/V display device that is located remotely from the A/V hub, such as in another room) without a need for a separate set-top box that is located proximate to the A/V display device. Instead, the A/V hub may perform all of the frame-by-frame transcoding of the video content that is needed for the A/V display device to display the video content before providing the video content to the A/V display device. Thus, in contrast with many existing cable and satellite systems, the A/V hub may provide video content to multiple A/V display devices (such as N A/V display devices) without the use of N associated set-top boxes. Consequently, the A/V hub may eliminate the need for a separate set-top box in the same room as an A/V display device (although there may be a local wireless receiver that is associated with the A/V hub). This capability may be enabled by the knowledge of the device state information and the content selected by the users that is available to the A/V hub. In addition, this capability may eliminate the need for a user to know where or how a particular A/V display device is connected to a content source, such as cable television or a satellite dish.

We now describe embodiments of the information displayed on the A/V display device (in conjunction with one or more virtual command icons in the user interface on the portable electronic device) during method 1800 (FIG. 18). FIG. 20 presents a drawing illustrating a display 2000 in an A/V display device (such as A/V display device 114-1 in FIG. 1). In particular, after selecting a virtual command icon associated with an active content source that is currently streaming content to the A/V display device and activating an associated casting virtual command icon, display 2000 may show a list of A/V display devices 2010 at other locations. If the user selects another A/V display device in the list of A/V display devices 2010 (such as A/V display device 114-2 in FIG. 1) by activating a single virtual command icon in the user interface on the portable electronic device, at least some of the HDMI content displayed on the A/V display device (such as the HDMI content in optional tiled window 2012) may be cast to other A/V display device in the list of A/V display devices 2010. This casting may involve the A/V hub providing one or more commands or instructions, including selectively turning on the other A/V display device (if it is not already turned on or activated), instructing the content source to provide a data stream with the HDMI content to the other A/V display device, etc. Thus, the one or more commands or instructions may be based on device-state information about the other A/V display device and the content source. Note that the HDMI content may or may not still be displayed in optional tiled window 2012. For example, when the casting operation is specified optional tiled window 2012 may no longer be displayed. Alternatively, optional tiled window 2012 may be displayed until the user activates a virtual command icon to discontinue the displaying of the HDMI content.

Figure 21:
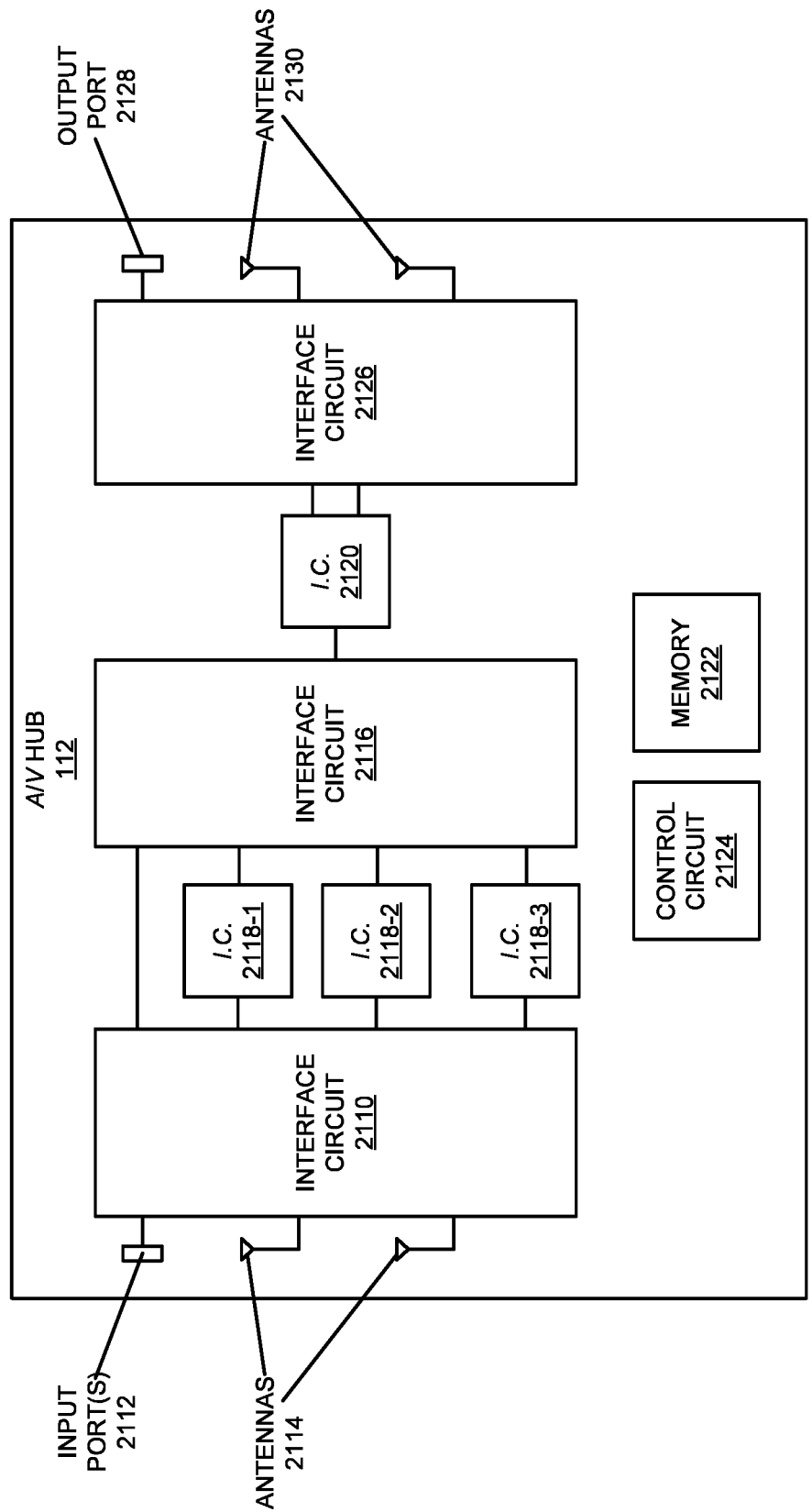
FIG. 21 is a drawing illustrating an A/V hub in FIG. 1 in accordance with an embodiment of the present disclosure.

We now describe embodiments of generating an output data stream from A/V hub 112 in FIG. 1. FIG. 21 presents a drawing illustrating A/V hub 112. In A/V hub 112, one or more input data streams are received from one or more content sources. In particular, the one or more input data streams with video content that is compatible with or corresponds to (such as if at least one of the input data streams is encoded and/or compressed) a high-definition format (such as 1080p and/or HDMI) may be received by interface circuit 2110 via one or more input ports 2112 (such as HDMI-compatible input ports) and/or one or more antennas 2114. For example, the one or more input data streams may include full frames of video content from the one or more content sources.

Moreover, one of the input data streams may be input directly to an integrated circuit (I.C.) 2116 (such as an integrated circuit from Broadcom). Additional input data streams in the one or more input streams may be input to integrated circuits 2118 (such as via a control logic 2124, e.g., an FPGA, an integrated circuit from Cavium, etc.), and the output transport streams from integrated circuits 2118 may be input to integrated circuit 2116 (e.g., using a real-time transport protocol). (Note that connections to memory 2122 and control logic 2124 are not shown in FIG. 21.) As described further below, integrated circuit 2116 may generate an output data stream, which may be provided, via interface circuit 2126, to output port 2128 (such as an HDMI-compatible output port) and/or one or more antennas 2130 for an A/V display device, such as A/V display device 114-1 (FIG. 1). This output data stream may include information associated with frames of scaled video content for the one or more input data streams, i.e., the output data stream may temporally multiplex the spatial information for different scaled video content, as well as display instructions that specify how the frames of scaled video content are to be displayed on the A/V display device. In some embodiments, optional digital-to-analog (A/D) integrated circuit 2120 may mirror the output data stream into two identical output data streams.

Note that integrated circuits 2118 (or other integrated circuits not shown) may decode the additional input data streams into separate buffers in memory 2122. Moreover, in embodiments where an input data stream is encrypted (such as using high-bandwidth digital content protection), it may be decrypted by one of integrated circuits 2118 (or by another integrated circuit not shown). Furthermore, integrated circuits 2118 may re-encode the video content using MPEG-4 Part 4 encoding (which is sometimes referred to as 'H.264'). However, audio content may be simply re-multiplexed into the transport stream and sent to integrated circuit 2116.

While integrated circuit 2116 may directly receive one input data stream that has the HDMI format or a YUV format, the additional input data streams may be MPEG-4 Part 4 encoded. Consequently, integrated circuit 2116 may first decode the additional input data streams. Then, integrated circuit 2116 may optionally recode three composite channels (such as RGB or YUV) for each of the video content into a single plane/buffer (such as a graphics plane) and, thus, into the output data stream. For local viewing, integrated circuit 2116 may output the output data stream to output port 2128. Thus, in some embodiments the output data stream may have the HDMI format (and may not be re-encoded or compressed). However, for remote viewing, the one or more antennas 2114 may be used. In these embodiments, the frames of scaled video content in the output data stream may be encoded using MPEG-4 Part 4 encoding.

In some embodiments, the re-encoding by integrated circuit 2116 and integrated circuits 2118 is variable bit rate with a maximum bit rate of 25 MBps. The frames of video content may also be an open group of pictures. For example, there may be one I frame (which is also the IDR frame), followed by several P frames. This pattern may be repeated multiple times as needed, or there may be additional P frames as needed. Note that when an electronic device (such as the A/V display device requests a new IDR frame (such as when some packets have been dropped), a new IDR frame may be encoded, and then once again followed by P frames.

Note that the temporally multiplexed frames of scaled video content in the output data stream may have a data rate that is less than a threshold value associated with swapping data in memory 2122. For example, memory 2122 may include DDR3 and the threshold value may be 25 Mb/s. DDR memory usually limits how much data in memory it can help move across the system. 25 Mb/s is a typical encoding bitrate without loss of image quality. In particular, 25 Mb/s may offer a reasonable compression of video without much loss in fidelity. Stated differently, DDR memory usually has a bandwidth constraint, which is why the data in A/V hub 112 is compressed. In this system, there are two kinds of memory: the system memory (which is used by the rest of the operating system to route data, handle network traffic, for user-interface information, etc.), and the video memory (which is owned and managed by a 'fast channel' or 'video network'). In particular, a DDR video network may be used to move uncompressed video data from the decoder output to the graphics compositor/display or the graphics plane. The fast past may start at the output of decoders (or HDMI uncompressed input), and may end at the graphics compositor. The video network may rely on a dedicated memory bank for specifically moving uncompressed audio/video data. This may ensure that data is moved using direct memory access across memory with an expected performance guarantee. However, the video network may be less flexible than the system memory in terms of what can be done with it. Therefore, it may be used to store the decoded frame, so the scaler can use it, then the scaled frame so the compositor can use it. In contrast, the system memory can be used to move memory from any source to any destination (e.g., from an input source to a network socket, or from a socket to a file, etc.) This is why it may be easier to deal with compressed/encoded video data in the system-memory domain, and uncompressed data in the video-network (video-memory) domain.

For an input data stream with a full frame of video content having a high-definition format (such as 1080p), there may be 1920×1080 bits/channel. Therefore, with three channels, there may be 6.22 Mb/frame. With 60 frames/s, the date rate for one unencoded or uncompressed input data stream with this video content may be 373.248 Mb/s. Consequently, in order to obtain the data rate of 25 Mb/s, this video content may be scaled and/or compressed by some 15× in the output data stream, so that each frame is some 416.6 k. With additional input data streams, data rate for the scaled video content in the output data stream may be adjusted or selected accordingly. For example, with the first tiled window have a size that is 2× that of the second tiled window, the resulting data rates for the scaled video content may be, respectively, less than 16.67 Mb/s and 8.33 Mb/s.

Moreover, the video content for the different input data streams may be scaled by integrated circuit 2116 based on the data-rate constraint and the display instructions. For example, the display instructions may specify two tiled windows that are associated, respectively, with first video content and second video content in two input data streams. The tiled windows may have a common size, or one may have a size that is a fraction of the size of the other tiled window (such as 0.5× or 0.25× the size of the other tiled window). Integrated circuit 2116 may scale the first video content and second video content (to generate first scaled video content and second scaled video content) based on the sizes of the tiled windows and the threshold value of the data rate of the output data stream.

Similarly, if a user uses portable electronic device 110 (such as by activating a virtual command icon in a user interface) to select another content source, A/V hub 112 may provide, via interface circuit 2116, a request to the other content source for a third vide stream, and then may receive, via interface circuit 2110, a third input data stream that includes frames of the third video content, which may correspond to the high-definition format. In this case, with three input data streams, the display instructions may specify three associated tiled windows. The tiled windows may have a common size, or the sizes of two of the tiled windows may be a fraction of the size of the other tiled window (such as 0.25× the size of the other tiled window). Integrated circuit 2116 may scale the first video content, the second video content and the third video content (to generate first scaled video content, second scaled video content and third scaled video content) based on the sizes of the tiled windows and the threshold value of the data rate of the output data stream.

While memory 2122 is shown as a separate, discrete component in FIG. 21 (which may be accessed by integrated circuit 2116, integrated circuits 2118 and/or control logic 2124), in other embodiments memory 2122 is distributed in A/V hub 112 and/or may be included in or proximate to other components, such as integrated circuit 2116, integrated circuits 2118 and/or control logic 2124.

Figure 22:
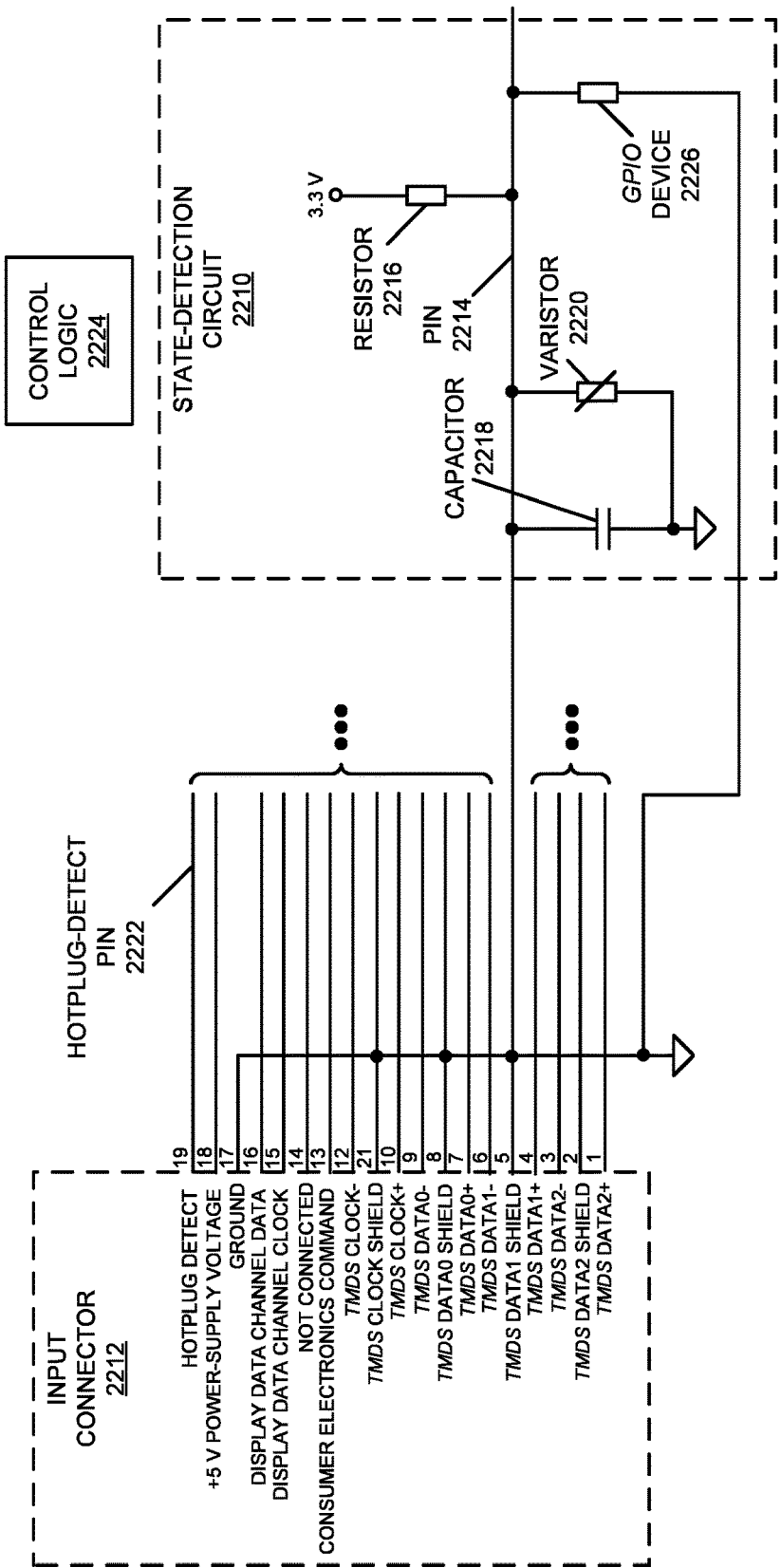
FIG. 22 is a block diagram illustrating a state-detection circuit in one of the electronic devices of FIG. 1 in accordance with an embodiment of the present disclosure.

As noted previously, the device-state information (such as whether an entertainment device is: electrically coupled to A/V hub 112 in FIG. 1, in a power-on state, in a power-off state, and/or another state, e.g., a playback state, a pause state, a stop state, etc.) may be determined using hardware (such as a state-detection circuit) and/or software (which may be executed by a processor and, more generally, a control circuit). FIG. 22 presents a block diagram illustrating a state-detection circuit 2210 in A/V hub 112 (FIG. 1). In A/V hub 112 (FIG. 1), input connector 2212 (which may be compatible with an HDMI standard) may be electrically coupled to an entertainment device. State-detection circuit 2210 may be coupled to at least pin 2214 in input connector 2212, so that, when the entertainment device is electrically coupled to input connector 2212, state-detection circuit 2210 establishes a ground loop between A/V hub 112 (FIG. 1) and the entertainment device. For example, pin 2214 may include a transition minimized differential signaling (TMDS) data1 shield. (Alternatively, pin 2214 may include a TMDS data1 shield.) Moreover, state-detection circuit 2210 may include: an energy-dissipation component (such as resistor 2216) electrically coupled to a power-supply voltage and pin 2214 (which may provide electrostatic-discharge protection); an energy-storage component (such as capacitor 2218) electrically coupled to pin 2214 and ground; and a bi-directional voltage clamp (such as varistor 2220 or a Verner diode), in parallel with capacitor 2218, electrically coupled to pin 2214 and ground. For example, resistor 2216 may be 150 kΩ and capacitor 2218 may be 0.047 µF. In some embodiments, state-detection circuit 2210 includes a general-purpose input/output (GPIO) device 2226 coupled to pin 2214. The behavior (such as an input pin, an output pin, enabled or disabled) of GPIO device 2226 may be controlled using control signals or instructions from control logic 2224.

Figure 23:
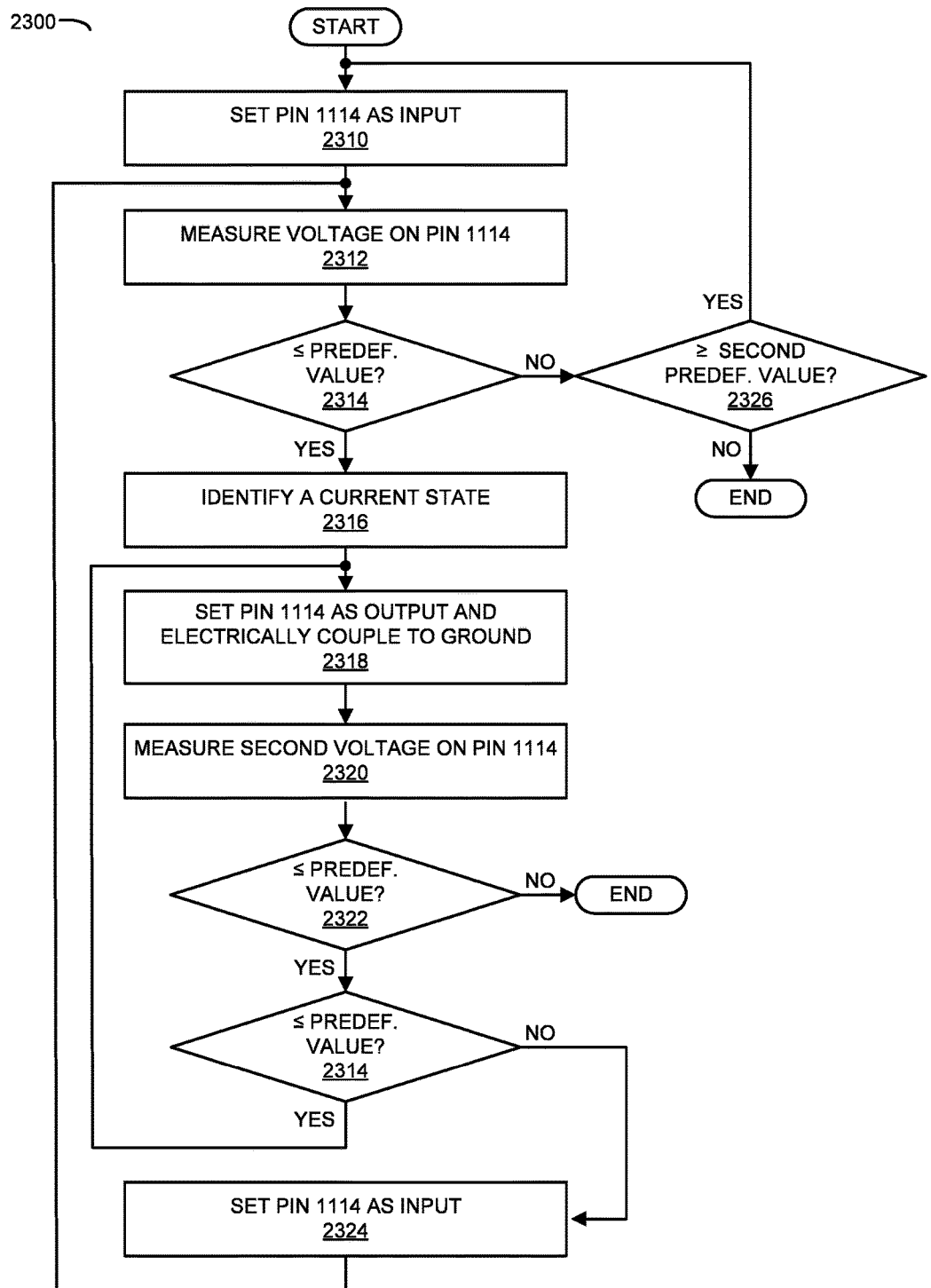
FIG. 23 is a flow diagram illustrating a method for detecting an entertainment device in accordance with an embodiment of the present disclosure.

FIG. 23 presents a flow diagram illustrating a method 2300 for detecting an entertainment device, which may be performed by an A/V hub (such as A/V hub 112 in FIG. 1) using state-detection circuit 2210 in FIG. 22. During operation, a control circuit (such as a processor and/or control logic 2224, which may be included in or external to state-detection circuit 2210) in A/V hub 112 (FIG. 1), which is electrically coupled to input connector 2212, detects whether there is electrical coupling between the entertainment device and input connector 2212 using state-detection circuit 2210 (FIG. 22). In particular, detecting whether there is electrical coupling between the entertainment device and input connector 2212 may involve: setting pin 2214 as an input (operation 2310), where pin 2214 is then pulled to a power-supply voltage by control logic 2224; measuring a voltage on pin 2214 (operation 2312) using control logic 2224; and detecting the electrical coupling between the entertainment device and input connector 2212 when the voltage on pin 2214 is less than or equal to a predefined value (operation 2314), such as when the voltage is approximately ground, using control logic 2224. Note that, when the electrical coupling between the entertainment device and input connector 2212 is detected, control logic 2224 may: set pin 2214 as an output and electrically couple pin 2214 to ground (operation 2318), which may improve signal integrity; and measure a second voltage (operation 2320) on hotplug-detect pin 2222 in input connector 2212. When the second voltage on hotplug-detect pin 2222 is less than or equal to the predefined value (operation 2322), control logic 2224 may set pin 2214 as an input (operation 2324) and repeat the measurement of the voltage on pin 2214 (operation 2312). Alternatively, when the voltage equals or exceeds a second predefined value (operation 2326), such as when the voltage is approximately the power-supply voltage, control logic 2224 may repeat detecting whether there is electrical coupling between the entertainment device and input connector 2212. Furthermore, when the voltage is less than or equal to the predefined value (operation 2314), control logic 2224 may identify a current state (operation 2316) of the entertainment device, such as: a power-off state, and a standby state. For example, control logic 2224 may provide the set of first control commands, provide the set of second control commands, and/or may monitor (via one or more pins in input connector 2212) content activity, such as a data stream to and/or from the entertainment device. Thus, control logic 2224 may determine that the entertainment device is: in the power-off state when there is no a data stream; in the standby state when the data stream has a low data rate; and in the playback state when the data stream has a data rate associated with A/V content and/or includes the A/V content. Note that, when the second voltage on hotplug-detect pin 2222 is less than or equal to the predefined value (operation 2322) and when the voltage is less than or equal to the predefined value (operation 2314), control logic 2224 may repeat setting pin 2214 as the output and electrically coupling pin 2214 to ground (operation 2318).

When the electrical coupling between the entertainment device and input connector 2212 is detected, control logic 2224 may optionally attempt to identify the entertainment device by providing consumer-electronics-control commands (which may be compatible with an HDMI standard) to the entertainment device. Alternatively or additionally (such as when the attempt is unsuccessful), control logic 2224 may provide a set of first control commands associated with different types of entertainment devices until, in response, content activity (such as packets or frames associated with a data stream of content communicated to and/or from the entertainment device) is detected by control logic 2224 via input connector 2212. For example, the set of first commands may include: a play command for the different types of entertainment devices; and/or a trick-mode command (such as fast forward, reverse, fast reverse, or skip) for the different types of entertainment devices. Moreover, when the content activity is detected, control logic 2224 may provide a set of second control commands associated with different providers of entertainment devices until a change in a state of the entertainment device is detected by control logic 2224 via input connector 2212 and state-detection circuit 2210. The set of second control commands may include: power-on control commands for the different providers of entertainment devices; and/or power-off control commands for the different providers of entertainment devices.

Alternatively or additionally, during operation control logic 2224 may detect whether there is electrical coupling between the entertainment device and input connector 2212 using state-detection circuit 2210 (FIG. 22). When the electrical coupling between the entertainment device and input connector 2212 is detected, control logic 2224 may: set pin 2214 as an output and electrically couple pin 2214 to ground; and measure the second voltage on hotplug-detect pin 2222 in input connector 2212. When the second voltage on hotplug-detect pin 2222 is less than or equal to the predefined value, control logic 2224 may set pin 2214 as an input and measure a voltage on pin 2214. Moreover, when the voltage equals or exceeds the second predefined value, control logic 2224 may repeat detecting whether there is electrical coupling between the entertainment device and input connector 2212. Furthermore, when the voltage is less than or equal to the predefined value, control logic 2224 may identify the current state of the entertainment device. In some embodiments, control logic 2224: provides a control command to the entertainment device; and identifies an additional state of the entertainment device based on content (such as A/V content) that is provided and/or received by the entertainment device in response to the control command. For example, the control command may include: a play command, and/or a trick-mode command (such as fast forward or fast skip, slow forward or slow skip, fast reverse, or slow reverse).

We now describe embodiments of an electronic device. FIG. 24 presents a block diagram illustrating an electronic device 2400, such as portable electronic device 110, A/V hub 112 or A/V display device 114-1 in FIG. 1. This electronic device includes processing subsystem 2410, memory subsystem 2412, networking subsystem 2414 and optional feedback subsystem 2434. Processing subsystem 2410 includes one or more devices configured to perform computational operations. For example, processing subsystem 2410 can include one or more microprocessors, application-specific integrated circuits (ASICs), microcontrollers, programmable-logic devices, and/or one or more digital signal processors (DSPs). One or more of these components in processing subsystem are sometimes referred to as a 'control circuit.'

Memory subsystem 2412 includes one or more devices for storing data and/or instructions for processing subsystem 2410 and networking subsystem 2414. For example, memory subsystem 2412 can include dynamic random access memory (DRAM), static random access memory (SRAM), and/or other types of memory. In some embodiments, instructions for processing subsystem 2410 in memory subsystem 2412 include: one or more program modules or sets of instructions (such as program module 2422 or operating system 2424), which may be executed by processing subsystem 2410. Note that the one or more program modules may constitute a computer-program mechanism, such as a computer program or software. Moreover, instructions in the various modules in memory subsystem 2412 may be implemented in: a high-level procedural language, an object-oriented programming language, and/or in an assembly or machine language. Furthermore, the programming language may be compiled or interpreted, e.g., configurable or configured (which may be used interchangeably in this discussion), to be executed by processing subsystem 2410.

In addition, memory subsystem 2412 can include mechanisms for controlling access to the memory. In some embodiments, memory subsystem 2412 includes a memory hierarchy that comprises one or more caches coupled to a memory in electronic device 2400. In some of these embodiments, one or more of the caches is located in processing subsystem 2410.

In some embodiments, memory subsystem 2412 is coupled to one or more high-capacity mass-storage devices (not shown). For example, memory subsystem 2412 can be coupled to a magnetic or optical drive, a solid-state drive, or another type of mass-storage device. In these embodiments, memory subsystem 2412 can be used by electronic device 2400 as fast-access storage for often-used data, while the mass-storage device is used to store less frequently used data.

Networking subsystem 2414 includes one or more devices configured to couple to and communicate on a wired and/or wireless network (i.e., to perform network operations), including: control logic 2416, interface circuits 2418 and associated antennas 2420. (While FIG. 24 includes antennas 2420, in some embodiments electronic device 2400 includes one or more nodes, such as nodes 2408, e.g., pads, which can be coupled to antennas 2420. Thus, electronic device 2400 may or may not include antennas 2420.) For example, networking subsystem 2414 can include a Bluetooth networking system, a cellular networking system (e.g., a 3G/4G network such as UMTS, LTE, etc.), a universal serial bus (USB) networking system, a networking system based on the standards described in IEEE 802.11 (e.g., a Wi-Fi networking system), an Ethernet networking system, and/or another networking system. Note that the combination of a given one of interface circuits 2418 and at least one of antennas 2420 may constitute a radio. In some embodiments, networking subsystem 2414 includes a wired interface, such as HDMI interface 2430 (which may include a state-detection circuit).

Networking subsystem 2414 includes processors, controllers, radios/antennas, sockets/plugs, and/or other devices used for coupling to, communicating on, and handling data and events for each supported networking system. Note that mechanisms used for coupling to, communicating on, and handling data and events on the network for each network system are sometimes collectively referred to as a 'network interface' for the network system. Moreover, in some embodiments a 'network' between the electronic devices does not yet exist. Therefore, electronic device 2400 may use the mechanisms in networking subsystem 2414 for performing simple wireless communication between the electronic devices, e.g., transmitting advertising or beacon frames and/or scanning for advertising frames transmitted by other electronic devices as described previously.

Within electronic device 2400, processing subsystem 2410, memory subsystem 2412, networking subsystem 2414 and optional feedback subsystem 2434 are coupled together using bus 2428. Bus 2428 may include an electrical, optical, and/or electro-optical connection that the subsystems can use to communicate commands and data among one another. Although only one bus 2428 is shown for clarity, different embodiments can include a different number or configuration of electrical, optical, and/or electro-optical connections among the subsystems.

In some embodiments, electronic device 2400 includes a display subsystem 2426 for displaying information on a display (such as the communication warning message), which may include a display driver, an I/O controller and the display. Note that a wide variety of display types may be used in display subsystem 2426, including: a two-dimensional display, a three-dimensional display (such as a holographic display or a volumetric display), a head-mounted display, a retinal-image projector, a heads-up display, a cathode ray tube, a liquid-crystal display, a projection display, an electroluminescent display, a display based on electronic paper, a thin-film transistor display, a high-performance addressing display, an organic light-emitting diode display, a surface-conduction electronic-emitter display, a laser display, a carbon-nanotube display, a quantum-dot display, an interferometric modulator display, a multi-touch touchscreen (which is sometimes referred to as a touch-sensitive display), and/or a display based on another type of display technology or physical phenomenon.

Furthermore, optional feedback subsystem 2434 may include one or more sensor-feedback mechanisms or devices, such as: a vibration mechanism or a vibration actuator (e.g., an eccentric-rotating-mass actuator or a linear-resonant actuator), a light, one or more speakers, etc., which can be used to provide feedback to a user of electronic device 2400 (such as sensory feedback about the status of a user instruction to change the state of one of the components in system 100 in FIG. 1).

Electronic device 2400 can be (or can be included in) any electronic device with at least one network interface. For example, electronic device 2400 can be (or can be included in): a desktop computer, a laptop computer, a subnotebook/netbook, a server, a tablet computer, a smartphone, a cellular telephone, a consumer-electronic device (such as a television, a set-top box, audio equipment, video equipment, etc.), a remote control, a portable computing device, an access point, a router, a switch, communication equipment, test equipment, and/or another electronic device.

Although specific components are used to describe electronic device 2400, in alternative embodiments, different components and/or subsystems may be present in electronic device 2400. For example, electronic device 2400 may include one or more additional processing subsystems, memory subsystems, networking subsystems, and/or display subsystems. Moreover, while one of antennas 2420 is shown coupled to a given one of interface circuits 2418, there may be multiple antennas coupled to the given one of interface circuits 2418. For example, an instance of a 3×3 radio may include three antennas. Additionally, one or more of the subsystems may not be present in electronic device 2400. Furthermore, in some embodiments, electronic device 2400 may include one or more additional subsystems that are not shown in FIG. 24. Also, although separate subsystems are shown in FIG. 24, in some embodiments, some or all of a given subsystem or component can be integrated into one or more of the other subsystems or component(s) in electronic device 2400. For example, in some embodiments program module 2422 is included in operating system 2424.

Moreover, the circuits and components in electronic device 2400 may be implemented using any combination of analog and/or digital circuitry, including: bipolar, PMOS and/or NMOS gates or transistors. Furthermore, signals in these embodiments may include digital signals that have approximately discrete values and/or analog signals that have continuous values. Additionally, components and circuits may be single-ended or differential, and power supplies may be unipolar or bipolar.

An integrated circuit may implement some or all of the functionality of networking subsystem 2414, such as one or more radios. Moreover, the integrated circuit may include hardware and/or software mechanisms that are used for transmitting wireless signals from electronic device 2400 and receiving signals at electronic device 2400 from other electronic devices. Aside from the mechanisms herein described, radios are generally known in the art and hence are not described in detail. In general, networking subsystem 2414 and/or the integrated circuit can include any number of radios.

In some embodiments, networking subsystem 2414 and/or the integrated circuit include a configuration mechanism (such as one or more hardware and/or software mechanisms) that configures the radios to transmit and/or receive on a given channel (e.g., a given carrier frequency). For example, in some embodiments, the configuration mechanism can be used to switch the radio from monitoring and/or transmitting on a given channel to monitoring and/or transmitting on a different channel. (Note that 'monitoring' as used herein comprises receiving signals from other electronic devices and possibly performing one or more processing operations on the received signals, e.g., determining if the received signal comprises an advertising frame, calculating a performance metric, performing spectral analysis, etc.) Furthermore, networking subsystem 2414 may include at least one port (such as an HDMI port 2432) to receive and/or provide the information in the data stream to A/V display device 114-1 (FIG. 1) and/or one of the one or more content sources 116 (FIG. 1).

While a communication protocol compatible with Wi-Fi was used as an illustrative example, the described embodiments may be used in a variety of network interfaces. Furthermore, while some of the operations in the preceding embodiments were implemented in hardware or software, in general the operations in the preceding embodiments can be implemented in a wide variety of configurations and architectures. Therefore, some or all of the operations in the preceding embodiments may be performed in hardware, in software or both. For example, at least some of the operations in the display technique may be implemented using program module 2422, operating system 2424 (such as drivers for interface circuits 2418) and/or in firmware in interface circuits 2418. Alternatively or additionally, at least some of the operations in the display technique may be implemented in a physical layer, such as hardware in interface circuits 2418.

Moreover, while the preceding embodiments included a touch-sensitive display in the portable electronic device that the user touches (e.g., with a finger or digit, or a stylus), in other embodiments the user interface is display on a display in the portable electronic device and the user interacts with the user interface without making contact or touching the surface of the display. For example, the user's interact(s) with the user interface may be determined using time-of-flight measurements, motion sensing (such as a Doppler measurement) or another non-contact measurement that allows the position, direction of motion and/or speed of the user's finger or digit (or a stylus) relative to position(s) of one or more virtual command icons to be determined. In these embodiments, note that the user may activate a given virtual command icon by performing a gesture (such as 'tapping' their finger in the air without making contact with the surface of the display). In some embodiments, the user navigates through the user interface and/or activates/deactivates functions of one of the components in system 100 (FIG. 1) using spoken commands or instructions (i.e., via voice recognition) and/or based on where they are looking in the visual feedback displayed on A/V display device 114-1 in FIG. 1 (e.g., by tracking the user's gaze or where the user is looking).

Furthermore, while A/V hub 112 (FIG. 1) was illustrated as a separate component from A/V display device 114-1 (FIG. 1), in some embodiments the components are combined into a single component or a single electronic device.

While the preceding embodiments illustrated the display technique with audio and video content (such as HDMI content), in other embodiments the display technique is used in the context of an arbitrary type of data or information. For example, the display technique may be used with home-automation data. In these embodiments, A/V hub 112 (FIG. 1) may facilitate communication among and control of a wide variety of electronic devices, including electronic devices in addition to or other than entertainment devices. Thus, A/V hub 112 (FIG. 1) and the display technique may be used to facilitate or implement the so-called Internet of things.

Moreover, in the display technique different types of content may be treated similarly. For example, audio may be output and a corresponding image or icon may be displayed in a tiled window. Furthermore, the other operations (such as casting) associated with the user interface and the information displayed on the A/V display device may have the same look and feel and functionality as with HDMI content.

In the preceding description, we refer to 'some embodiments.' Note that 'some embodiments' describes a subset of all of the possible embodiments, but does not always specify the same subset of embodiments.

The foregoing description is intended to enable any person skilled in the art to make and use the disclosure, and is provided in the context of a particular application and its requirements. Moreover, the foregoing descriptions of embodiments of the present disclosure have been presented for purposes of illustration and description only. They are not intended to be exhaustive or to limit the present disclosure to the forms disclosed. Accordingly, many modifications and variations will be apparent to practitioners skilled in the art, and the general principles defined herein may be applied to other embodiments and applications without departing from the spirit and scope of the present disclosure. Additionally, the discussion of the preceding embodiments is not intended to limit the present disclosure. Thus, the present disclosure is not intended to be limited to the embodiments shown, but is to be accorded the widest scope consistent with the principles and features disclosed herein.

What is claimed is:

1. An electronic device, comprising: an input port; an output port; one or more antennas; an interface circuit communicatively coupled to the input port, the output port and the one or more antennas; memory configured to store uncompressed video, wherein the memory is configured for use in dedicated video processing of the uncompressed video and has direct memory access; second memory configured to store an operating system and compressed video: and one or more integrated circuits, coupled to the interface circuit and the memory, configured to:

receive at least two input data streams that comprise full frames of first video content and full frames of second video content, wherein the input data streams correspond to a high-definition format;

generate, using the memory, an output data stream, having a data rate that is less than a threshold value associated with swapping data in the memory and that is compatible with a high-definition multimedia-interface (HDMT) format, and which comprises temporally multiplexed frames of scaled first video content and frames of scaled second video content, and display instructions that specify a first tiled window associated with the scaled first video content and a second tiled window associated with the scaled second video content wherein the scaled first video content and the scaled second video content have the high-definition format and comprise component channels, and wherein the generating comprises compression of the first video content to create the first scaled video content and compression of the second video content to create the second scaled video content; and provide, via the interface circuit, the output data stream for a display device, wherein the generating comprises generating the scaled first video content by scaling the first video content based on a size of the first tiled window, and generating the scaled second video content by scaling the second video content based on a size of the second tiled window.

2. The electronic device of claim 1, wherein one of the input data streams is encoded; and
wherein the generating of the output data stream comprises decoding and decompressing the one of the input data streams.

3. The electronic device of claim 1, wherein the one of the input data streams is encoded using MPEG-4 Part 4 encoding.

4. The electronic device of claim 1, wherein the memory comprises DDR3 and the threshold value is 25 Mb/s.

5. The electronic device of claim 1, wherein the first tiled window and the second tiled window have a common size.

6. The electronic device of claim 1, wherein a size of the first tiled window is at least two times a size of the second tiled window.

7. The electronic device of claim 1, wherein, in response to the interface circuit receiving user-interface activity information, associated with a portable electronic device, which specifies a selection of a content source, the electronic device is configured to:

provide, via the interface circuit, a request for the content source for a third vide video stream; and
receive a third input data stream that comprises frames of the third video content, wherein the third input data stream correspond to the high-definition format;
wherein the output data stream further comprises frames of scaled third video content and the display instructions further specify a third tiled window associated with the scaled third video content; and
wherein the scaled third video content has the high-definition format and comprises the component channels.

8. The electronic device of claim 7, wherein a size of the first tiled window is at least four times a size of the second tiled window and is at least four times a size of the third tiled window.

9. A non-transitory computer-readable storage medium for use in conjunction with an electronic device, the computer-readable storage medium storing a program module that, when executed by the electronic device, to provide an output data stream by causing the electronic device to perform one or more operations comprising:

receiving at least two input data streams that comprise full frames of first video content and full frames of second video content, wherein the input data streams correspond to a high-definition format;

generating, via one or more integrated circuits and dedicated memory in the electronic device for video processing that has direct memory access, the output data stream, having a data rate that is less than a threshold value associated with swapping data in memory in the electronic device and that is compatible with a high-definition multimedia-interface (HDMT) format, and which comprises temporally multiplexed frames of scaled first video content and frames of scaled second video content, and display instructions that specify a first tiled window associated with the scaled first video content and a second tiled window associated with the scaled second video content, wherein the scaled first video content and the scaled second video content have the high-definition format and comprise component channels, and wherein the generating comprises compression of the first video content to create the first scaled video content and compression of the second video content to create the second scaled video content; and providing, via an interface circuit in the electronic device, the output data stream for a display device, wherein uncompressed video is stored in the dedicated memory and compressed video is stored is second memory in the electronic device, and wherein the second memory stores an operating system of the electronic device, wherein the generating comprises generating the scaled first video content by scaling the first video content based on a size of the first tiled window, and generating the scaled second video content by scaling the second video content based on a size of the second tiled window.

10. The non-transitory computer-readable storage medium of claim 9, wherein one of the input data streams is encoded; and wherein the generating of the output data stream comprises decoding and decompressing the one of the input data streams.

11. The non-transitory computer-readable storage medium of claim 9, wherein the memory comprises DDR3 and the threshold value is 25 Mb/s.

12. The non-transitory computer-readable storage medium of claim 9, wherein the first tiled window and the second tiled window have a common size.

13. The non-transitory computer-readable storage medium of claim 9, wherein a size of the first tiled window is at least two times a size of the second tiled window.

14. The non-transitory computer-readable storage medium of claim 9, wherein, in response to the interface circuit receiving user-interface activity information, associated with a portable electronic device, which specifies a selection of a content source, the one or more operations comprise:

providing, via the interface circuit, a request for the content source for a third video stream; and receiving a third input data stream that comprises frames of the third video content, wherein the third input data stream correspond to the high-definition format;

wherein the output data stream further comprises frames of scaled third video content and the display instructions further specify a third tiled window associated with the scaled third video content; and wherein the scaled third video content has the high-definition format and comprises the component channels.

15. The non-transitory computer-readable storage medium of claim 14, wherein a size of the first tiled window is at least four times a size of the second tiled window and is at least four times a size of the third tiled window.

16. A method for providing an output data stream, wherein the method comprises:

by an electronic device:

receiving at least two input data streams that comprise full frames of first video content and full frames of second video content, wherein the input data streams correspond to a high-definition format;

generating, via one or more integrated circuits and dedicated memory in the electronic device for video processing that has direct memory access, the output data stream, having a data rate that is less than a threshold value associated with swapping data in memory in the electronic device and that is compatible with a high-definition multimedia-interface (HDMI) format, and which comprises temporally multiplexed frames of scaled first video content and frames of scaled second video content, and display instructions that specify a first tiled window associated with the scaled first video content and a second tiled window associated with the scaled second video content, wherein the scaled first video content and the scaled second video content have the high-definition format and comprise component channels, and wherein generating comprises compression of the first video content to create the first scaled video content and compression of the second video content to create the second scaled video content; and providing, via an interface circuit in the electronic device, the output data stream for a display device, wherein uncompressed video is stored in the dedicated memory and compressed video is stored is second memory in the electronic device, and wherein the second memory stores an operating system of the electronic device, wherein the generating comprises generating the scaled first video content by scaling the first video content based on a size of the first tiled window, and generating the scaled second video content by scaling the second video content based on a size of the second tiled window.

17. The method of claim 16, wherein the memory comprises DDR3 and the threshold value is 25 Mb/s.

* * * * *